US012689415B2

(12) United States Patent
Zhang et al.

(10) Patent No.: US 12,689,415 B2
(45) Date of Patent: Jul. 21, 2026

(54) MULTI-USER MULTIPLE INPUT MULTIPLE OUTPUT (MIMO) FOR LINE-OF-SIGHT MIMO WITH A RECTANGULAR ANTENNA ARRAY

(71) Applicant: QUALCOMM Incorporated, San Diego, CA (US)

(72) Inventors: Danlu Zhang, San Diego, CA (US); Juergen Cezanne, Ocean Township, NJ (US); Bilal Sadiq, Southlake, TX (US); Abdelrahman Mohamed Ahmed Mohamed Ibrahim, San Diego, CA (US); Meilong Jiang, Westfield, NJ (US); Renqiu Wang, San Diego, CA (US); Tingfang Ji, San Diego, CA (US); Yu Zhang, San Diego, CA (US); Ashwin Sampath, Skillman, NJ (US); Junyi Li, Greentown, PA (US)

(73) Assignee: QUALCOMM Incorporated, San Diego, CA (US)

( * ) Notice: Subject to any disclaimer, the term of this patent is extended or adjusted under 35 U.S.C. 154(b) by 135 days.

(21) Appl. No.: 18/714,427

(22) PCT Filed: Mar. 1, 2022

(86) PCT No.: PCT/CN2022/078592
§ 371 (c)(1),
(2) Date: May 29, 2024

(87) PCT Pub. No.: WO2023/164800
PCT Pub. Date: Sep. 7, 2023

(65) Prior Publication Data
US 2025/0030462 A1      Jan. 23, 2025

(51) Int. Cl.
*H04B 7/0452*      (2017.01)
*H04B 7/0456*      (2017.01)

(52) U.S. Cl.
CPC ......... *H04B 7/0452* (2013.01); *H04B 7/0469* (2013.01)

(58) Field of Classification Search
CPC .. H04B 7/0452; H04B 7/0469; H04B 7/0456; H04B 7/06956
See application file for complete search history.

(56) References Cited

U.S. PATENT DOCUMENTS

2019/0052336 A1      2/2019  Cai et al.
2019/0386733 A1*    12/2019  Nilsson ................ H04B 7/0695
(Continued)

FOREIGN PATENT DOCUMENTS

WO      WO-2013143617 A1     10/2013
WO          2021190750 A1      9/2021
(Continued)

OTHER PUBLICATIONS

International Search Report and Written Opinion—PCT/CN2022/078592—ISA/EPO—Nov. 21, 2022.
(Continued)

*Primary Examiner* — Vineeta S Panwalkar
(74) *Attorney, Agent, or Firm* — Harrity & Harrity, LLP

(57)      ABSTRACT
Various aspects of the present disclosure generally relate to wireless communication. In some aspects, a first network node may communicate with a second network node using a line-of-sight (LOS) multiple input multiple output (MIMO) configuration at a frequency. The first network node may communicate, based at least in part on a multi-user MIMO (MU MIMO) mode, with a third network node using the LOS MIMO configuration and at the frequency, wherein the MU MIMO mode corresponds to an antenna system configuration of the rectangular antenna array, wherein the antenna system configuration includes at least one of an antenna assignment scheme, an antenna amplitude
(Continued)

400 → configuration, or an antenna phase configuration. Numerous other aspects are described.

30 Claims, 14 Drawing Sheets

(56)                     References Cited

U.S. PATENT DOCUMENTS

2021/0013946 A1    1/2021  Coldrey et al.
2022/0149921 A1*   5/2022  Nilsson ............... H04B 7/0452

FOREIGN PATENT DOCUMENTS

WO      WO-2021183993 A1    9/2021
WO      WO-2021209792 A1    10/2021

OTHER PUBLICATIONS

Supplementary European Search Report—EP22929253—Search Authority—Munich—Jan. 23, 2026.
Supplementary Partial European Search Report—EP22929253—Search Authority—Munich—Oct. 28, 2025.

* cited by examiner

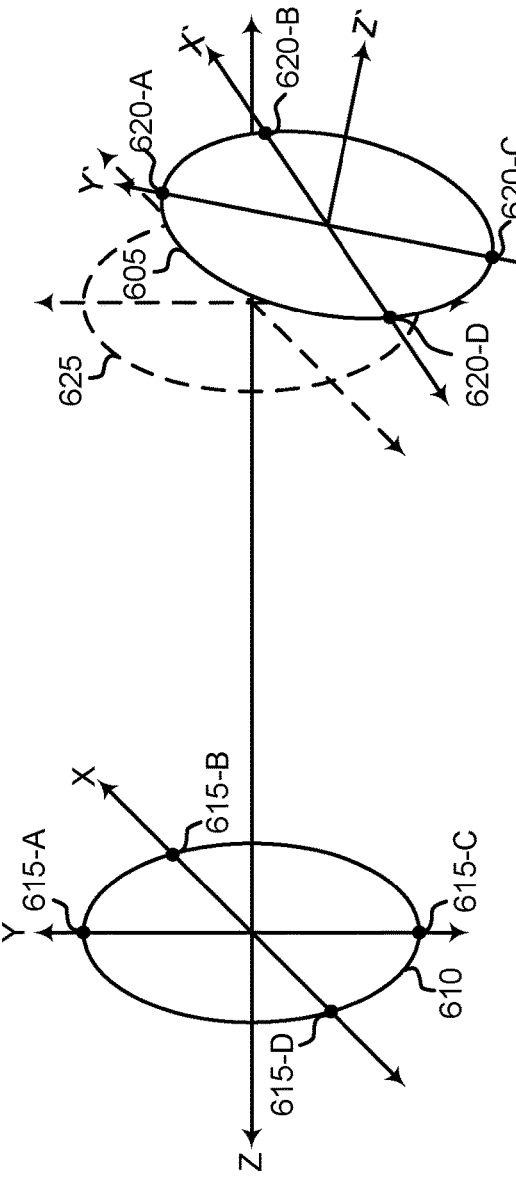
FIG. 6A

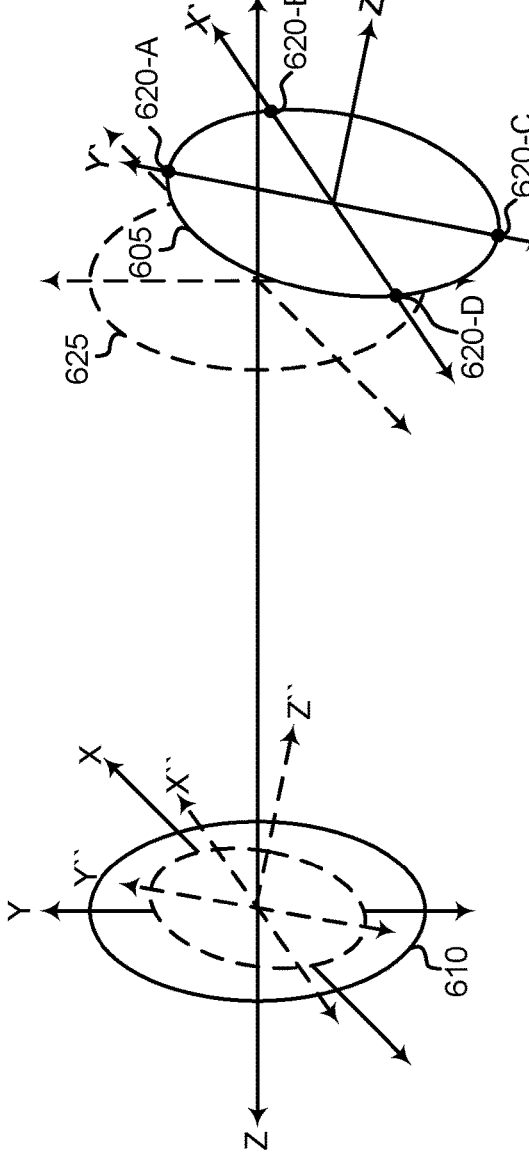
FIG. 6B

900

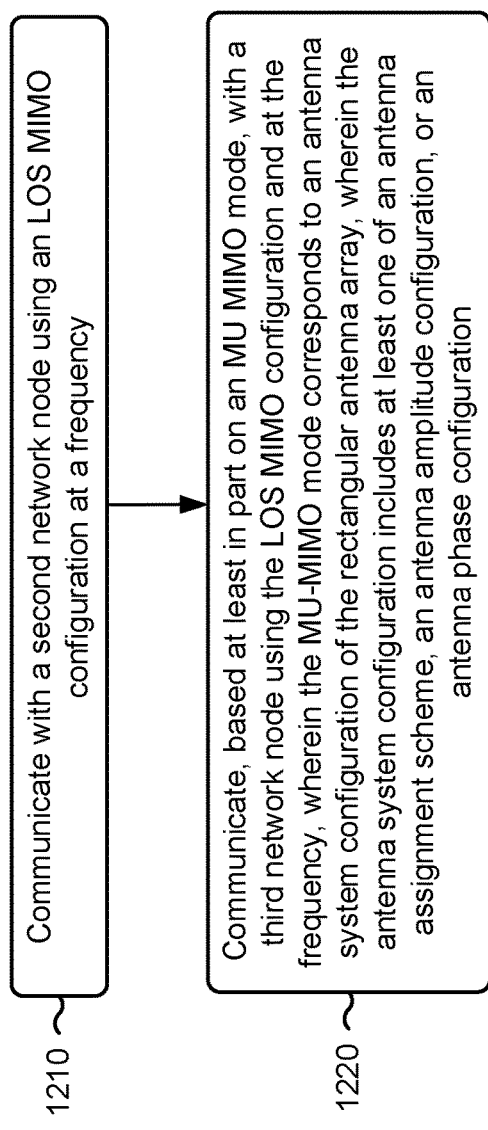

1210 — Communicate with a second network node using an LOS MIMO configuration at a frequency 1220 — Communicate, based at least in part on an MU MIMO mode, with a third network node using the LOS MIMO configuration and at the frequency, wherein the MU-MIMO mode corresponds to an antenna system configuration of the rectangular antenna array, wherein the antenna system configuration includes at least one of an antenna assignment scheme, an antenna amplitude configuration, or an antenna phase configuration

MULTI-USER MULTIPLE INPUT MULTIPLE OUTPUT (MIMO) FOR LINE-OF-SIGHT MIMO WITH A RECTANGULAR ANTENNA ARRAY

CROSS-REFERENCE TO RELATED APPLICATION

This application is a 371 national stage of Patent Cooperation Treaty (PCT) Application No. PCT/CN2022/078592, filed on Mar. 1, 2022, and entitled "MULTI-USER MULTIPLE INPUT MULTIPLE OUTPUT (MIMO) FOR LINE-OF-SIGHT MIMO WITH A RECTANGULAR ANTENNA ARRAY," which is hereby expressly incorporated by reference herein.

FIELD OF THE DISCLOSURE

Aspects of the present disclosure generally relate to wireless communication and to techniques and apparatuses for multi-user multiple input multiple output (MIMO) for line-of-sight MIMO with a rectangular array.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a first network node for wireless communication. The first network node may include a memory and one or more processors coupled to the memory. The one or more processors may be configured to communicate with a second network node using a line-of-sight (LOS) multiple input multiple output (MIMO) configuration at a frequency. The one or more processors may be configured to communicate, based at least in part on a multi-user MIMO (MU MIMO) mode, with a third network node using the LOS MIMO configuration and at the frequency, wherein the MU MIMO mode corresponds to an antenna system configuration of the rectangular antenna array, wherein the antenna system configuration includes at least one of an antenna assignment scheme, an antenna amplitude configuration, or an antenna phase configuration.

Some aspects described herein relate to a method of wireless communication performed by a first network node having a rectangular antenna array. The method may include communicating with a second network node using an LOS MIMO configuration at a frequency. The method may include communicating, based at least in part on an MU MIMO mode, with a third network node using the LOS MIMO configuration and at the frequency, wherein the MU MIMO mode corresponds to an antenna system configuration of the rectangular antenna array, wherein the antenna system configuration includes at least one of an antenna assignment scheme, an antenna amplitude configuration, or an antenna phase configuration.

Some aspects described herein relate to a non-transitory computer-readable medium that stores a set of instructions for wireless communication by a first network node. The set of instructions, when executed by one or more processors of the first network node, may cause the first network node to communicate with a second network node using an LOS MIMO configuration at a frequency. The set of instructions, when executed by one or more processors of the first network node, may cause the first network node to communicate, based at least in part on an MU MIMO mode, with a third network node using the LOS MIMO configuration and at the frequency, wherein the MU MIMO mode corresponds to an antenna system configuration of the rectangular antenna array, wherein the antenna system configuration includes at least one of an antenna assignment scheme, an antenna amplitude configuration, or an antenna phase configuration.

Some aspects described herein relate to an apparatus for wireless communication. The apparatus may include means for communicating with a second network node using an LOS MIMO configuration at a frequency. The apparatus may include means for communicating, based at least in part on an MU MIMO mode, with a third network node using the LOS MIMO configuration and at the frequency, wherein the MU MIMO mode corresponds to an antenna system configuration, wherein the antenna system configuration includes at least one of an antenna assignment scheme, an antenna amplitude configuration, or an antenna phase configuration of the rectangular antenna array.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 6A and 6B illustrate an example of an antenna array configuration that supports phase pre-compensation for misalignment in accordance with the present disclosure.

FIG. 12 is a diagram illustrating an example process associated with MU MIMO for LOS MIMO with a rectangular array, in accordance with the present disclosure.

DETAILED DESCRIPTION

Figure 1:
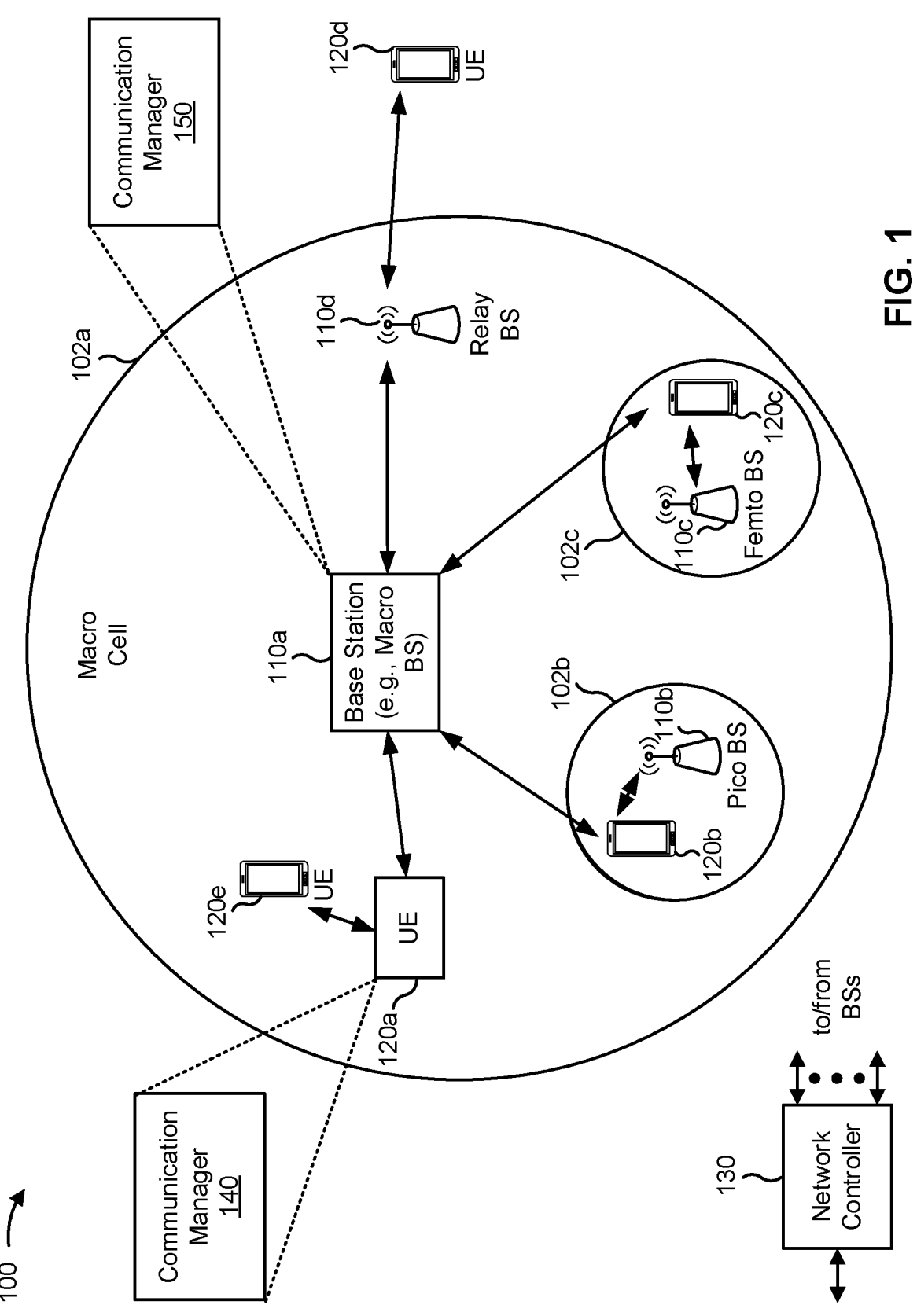
FIG. 1 is a diagram illustrating an example of a wireless network, in accordance with the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Aspects and examples generally include a method, apparatus, network node, system, computer program product, non-transitory computer-readable medium, user equipment, base station, wireless communication device, and/or processing system as described or substantially described herein with reference to and as illustrated by the drawings and specification.

This disclosure may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, are better understood from the following description when considered in connection with the accompanying figures. Each of the figures is provided for the purposes of illustration and description, and not as a definition of the limits of the claims.

While aspects are described in the present disclosure by illustration to some examples, such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component-based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). Aspects described herein may be practiced in a wide variety of devices, components, systems, distributed arrangements, and/or end-user devices of varying size, shape, and constitution.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHZ), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As described herein, a node, which may be referred to as a "node," a "network node," or a "wireless node," may be a base station (e.g., base station 110), a UE (e.g., UE 120), a relay device, a network controller, an apparatus, a device, a computing system, one or more components of any of these, and/or another processing entity configured to perform one or more aspects of the techniques described herein. For example, a network node may be a UE. As another example, a network node may be a base station. As an example, a first network node may be configured to communicate with a second network node or a third network node. The adjectives "first," "second," "third," and so on are used for contextual distinction between two or more of the modified noun in connection with a discussion and are not meant to be absolute modifiers that apply only to a certain respective node throughout the entire document. For example, a network node may be referred to as a "first network node" in connection with one discussion and may be referred to as a "second network node" in connection with another discussion, or vice versa. Reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE being configured to receive information from a base station also discloses a first network node being configured to receive information from a second network node, "first network node" may refer to a first UE, a first base station, a first apparatus, a first device, a first computing system, a first one or more components, a first processing entity, or the like configured to receive the information from the second network; and "second network node" may refer to a second UE, a second base station, a second apparatus, a second device, a second computing system, a second one or more components, a second processing entity, or the like.

In some aspects, a first network node may include a communication manager 140 or 150. As described in more detail elsewhere herein, the communication manager 140 or 150 may communicate with a second network node using a line-of-sight (LOS) multiple input multiple output (MIMO) configuration at a frequency; and communicate, based at least in part on a multi-user MIMO (MU MIMO) mode, with a third network node using the LOS MIMO configuration and at the frequency, wherein the MU MIMO mode corresponds to an antenna system configuration of the rectangular antenna array, wherein the antenna system configuration includes at least one of an antenna assignment scheme, an antenna amplitude configuration, or an antenna phase configuration. Additionally, or alternatively, the communication manager 140 or 150 may perform one or more other operations described herein.

As indicated above, FIG. 1 is provided as an example. Other examples may differ from what is described with regard to FIG. 1.

Figure 2:
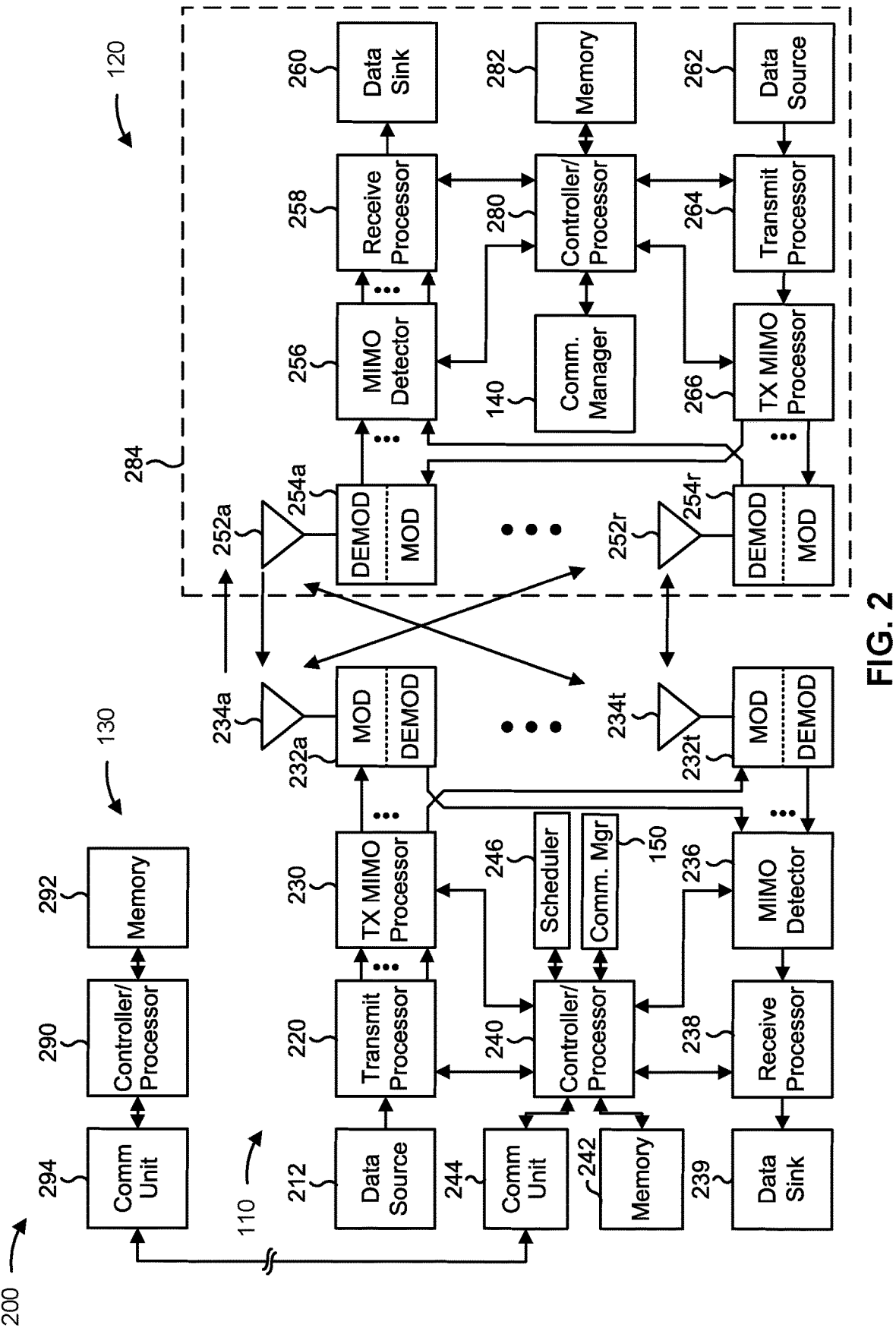
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmission (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

In some aspects, the term "base station" (e.g., the base station 110), "network node," or "network entity" may refer to an aggregated base station, a disaggregated base station, an integrated access and backhaul (IAB) node, a relay node, and/or one or more components thereof. For example, in some aspects, "base station," "network node," or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station," "network node," or "network entity" may refer to one device configured to perform one or more functions, such as those described herein in connection with the base station 110. In some aspects, the term "base station," "network node," or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station," "network node," or "network entity" may refer to any one or more of those different devices. In some aspects, the term "base station," "network node," or "network entity" may refer to one or more virtual base stations and/or one or more virtual base station functions. For example, in some aspects, two or more base station functions may be instantiated on a single device. In some aspects, the term "base station," "network node," or "network entity" may refer to one of the base station functions and not another. In this way, a single device may include more than one base station.

Deployment of communication systems, such as 5G New Radio (NR) systems, may be arranged in multiple manners with various components or constituent parts. In a 5G NR system, or network, a network node, a network entity, a mobility element of a network, a radio access network (RAN) node, a core network node, a network element, a base station, or a network equipment may be implemented in an aggregated or disaggregated architecture. For example, a base station (such as a Node B (NB), evolved NB (eNB), NR base station (BS), 5G NB, access point (AP), transmit receive point (TRP), or cell), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station may be configured to utilize a radio protocol stack that is physically or logically integrated within a single RAN node (for example, within a single device or unit). A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also may be implemented as virtual units (e.g., a virtual central unit (VCU), a virtual distributed unit (VDU), or a virtual radio unit (VRU)).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that may be individually deployed. A disaggregated base station may include functionality implemented across two or more units at various physical locations, as well as functionality implemented for at least one unit virtually, which may enable flexibility in network design. The various units of the disaggregated base station may be configured for wired or wireless communication with at least one other unit of the disaggregated base station.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

Each of the antenna elements may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, or other types of antennas arranged in a linear pattern, a two-dimensional pattern, or another pattern. A spacing between antenna elements may be such that signals with a desired wavelength transmitted separately by the antenna elements may interact or interfere (e.g., to form a desired beam). For example, given an expected range of wavelengths or frequencies, the spacing may provide a quarter wavelength, half wavelength, or other fraction of a wavelength of spacing between neighboring antenna elements to allow for interaction or interference of signals transmitted by the separate antenna elements within that expected range.

Antenna elements and/or sub-elements may be used to generate beams. "Beam" may refer to a directional transmission such as a wireless signal that is transmitted in a direction of a receiving device. A beam may include a directional signal, a direction associated with a signal, a set of directional resources associated with a signal (e.g., angle of arrival, horizontal direction, vertical direction), and/or a set of parameters that indicate one or more aspects of a directional signal, a direction associated with a signal, and/or a set of directional resources associated with a signal.

As indicated above, antenna elements and/or sub-elements may be used to generate beams. For example, antenna elements may be individually selected or deselected for transmission of a signal (or signals) by controlling an amplitude of one or more corresponding amplifiers. Beamforming includes generation of a beam using multiple signals on different antenna elements, where one or more, or all, of the multiple signals are shifted in phase relative to each other. The formed beam may carry physical or higher layer reference signals or information. As each signal of the multiple signals is radiated from a respective antenna element, the radiated signals interact, interfere (constructive and destructive interference), and amplify each other to form a resulting beam. The shape (such as the amplitude, width, and/or presence of side lobes) and the direction (such as an angle of the beam relative to a surface of an antenna array) can be dynamically controlled by modifying the phase shifts or phase offsets of the multiple signals relative to each other.

Beamforming may be used for communications between a UE and a base station, such as for millimeter wave communications and/or the like. In such a case, the base station may provide the UE with a configuration of transmission configuration indicator (TCI) states that respectively indicate beams that may be used by the UE, such as for receiving a physical downlink shared channel (PDSCH). The base station may indicate an activated TCI state to the UE, which the UE may use to select a beam for receiving the PDSCH.

A beam indication may be, or include, a TCI state information element, a beam identifier (ID), spatial relation information, a TCI state ID, a closed loop index, a panel ID, a TRP ID, and/or a sounding reference signal (SRS) set ID, among other examples. A TCI state information element (referred to as a TCI state herein) may indicate information associated with a beam such as a downlink beam. For example, the TCI state information element may indicate a TCI state identification (e.g., a tci-StateID), a quasi-co-location (QCL) type (e.g., a qcl-Type 1, qcl-Type2, qcl-TypeA, qcl-TypeB, qcl-TypeC, qcl-TypeD, and/or the like), a cell identification (e.g., a ServCellIndex), a bandwidth part identification (bwp-Id), a reference signal identification such as a CSI-RS (e.g., an NZP-CSI-RS-ResourceId, an SSB-Index, and/or the like), and/or the like. Spatial relation information may similarly indicate information associated with an uplink beam.

The beam indication may be a joint or separate downlink (DL)/uplink (UL) beam indication in a unified TCI framework. In some cases, the network may support layer 1 (L1)-based beam indication using at least UE-specific (unicast) downlink control information (DCI) to indicate joint or separate DL/UL beam indications from active TCI states. In some cases, existing DCI formats 1_1 and/or 1_2 may be reused for beam indication. The network may include a support mechanism for a UE to acknowledge successful decoding of a beam indication. For example, the acknowledgment/negative acknowledgment (ACK/NACK) of the PDSCH scheduled by the DCI carrying the beam indication may be also used as an ACK for the DCI.

Beam indications may be provided for carrier aggregation (CA) scenarios. In a unified TCI framework, information the network may support common TCI state ID update and activation to provide common QCL and/or common UL transmission spatial filter or filters across a set of configured component carriers (CCs). This type of beam indication may apply to intra-band CA, as well as to joint DL/UL and separate DL/UL beam indications. The common TCI state ID may imply that one reference signal (RS) determined according to the TCI state(s) indicated by a common TCI state ID is used to provide QCL Type-D indication and to determine UL transmission spatial filters across the set of configured CCs.

Some UEs and/or base stations may support full duplex operation in which the UEs and/or the base stations support full duplex operations. For example, a UE may support transmission via a first beam (e.g., using a first antenna panel) and may simultaneously support reception via a second beam (e.g., using a second antenna panel). Support for simultaneous transmission and reception may be conditional on beam separation, such as spatial separation (e.g., using different beams), frequency separation, and/or the like. Additionally, or alternatively, support for simultaneous transmission may be conditional on using beamforming (e.g., in frequency range 2 (FR2), in frequency range 4 (FR4), for millimeter wave signals, and/or the like).

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 8-13).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 8-13).

The controller/processor 240 of the base station 110, the controller/processor 280 of the UE 120, and/or any other component(s) of FIG. 2 may perform one or more techniques associated with MU MIMO for LOS MIMO with a rectangular array, as described in more detail elsewhere herein. In some aspects, the network node described herein is the base station 110, is included in the base station 110, or includes one or more components of the base station 110 shown in FIG. 2. In some aspects, the network node described herein is the UE 120, is included in the UE 120, or includes one or more components of the UE 120 shown in FIG. 2. For example, the controller/processor 240 of the base station 110, the controller/processor 280 of the UE 120, and/or any other component(s) of FIG. 2 may perform or direct operations of, for example, process 1200 of FIG. 12. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1200 of FIG. 12. In some examples, executing instructions may include running the instructions, converting the instructions, compiling the instructions, and/or interpreting the instructions, among other examples.

In some aspects, a first network node includes means for communicating with a second network node using an LOS MIMO configuration at a frequency; and/or means for communicating, based at least in part on an MU MIMO mode, with a third network node using the LOS MIMO configuration and at the frequency, wherein the MU MIMO mode corresponds to an antenna system configuration of the rectangular antenna array, wherein the antenna system configuration includes at least one of an antenna assignment scheme, an antenna amplitude configuration, or an antenna phase configuration. In some aspects, the means for the first network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the first network node to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
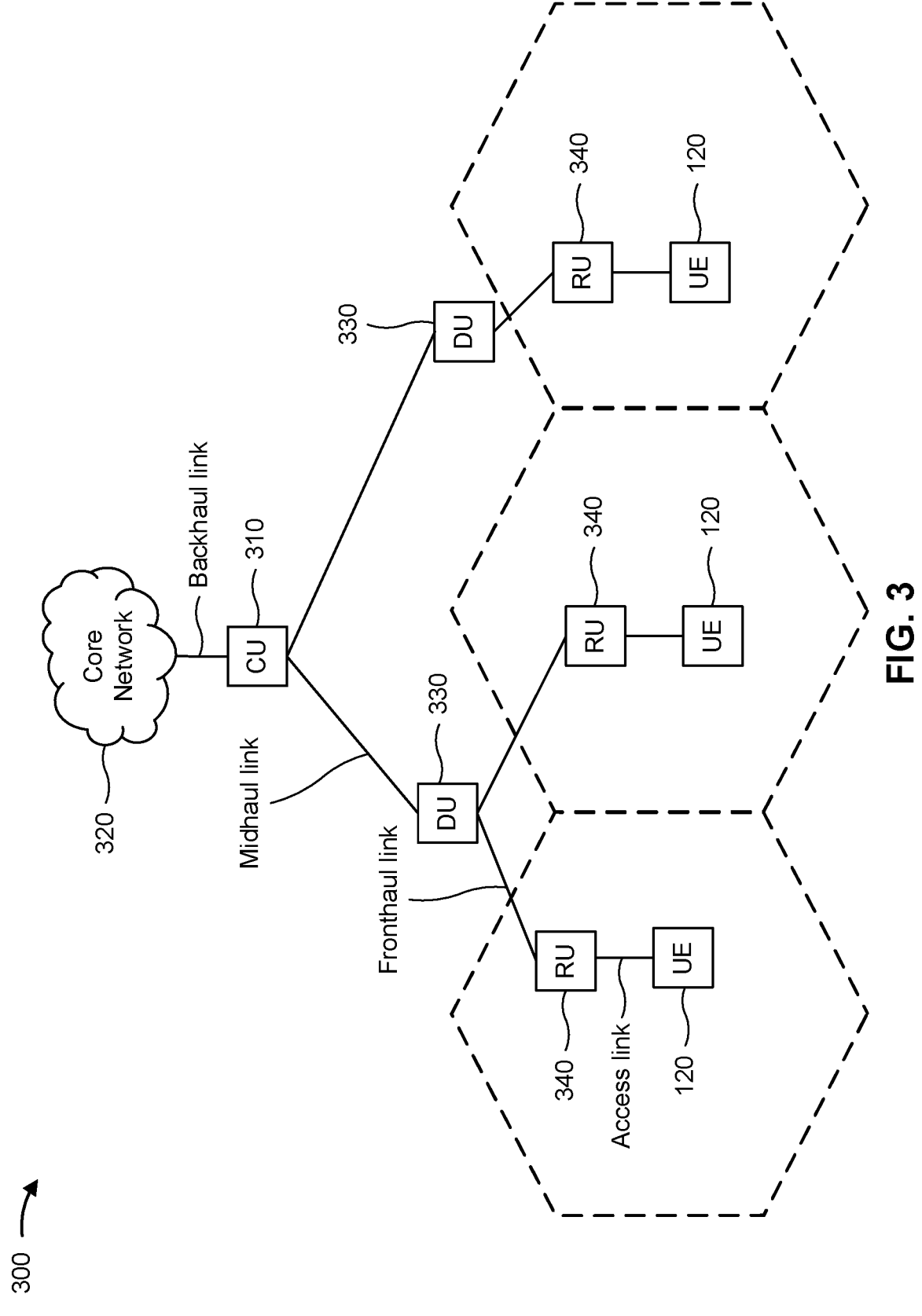
FIG. 3 is a diagram illustrating an example of an open radio access network architecture, in accordance with the present disclosure.

FIG. 3 is a diagram illustrating an example 300 of an O-RAN architecture, in accordance with the present disclosure. As shown in FIG. 3, the O-RAN architecture may include a control unit (CU) 310 that communicates with a core network 320 via a backhaul link. Furthermore, the CU 310 may communicate with one or more DUs 330 via respective midhaul links. The DUs 330 may each communicate with one or more RUs 340 via respective fronthaul links, and the RUs 340 may each communicate with respective UEs 120 via radio frequency (RF) access links. The DUs 330 and the RUs 340 may also be referred to as O-RAN DUS (O-DUs) 330 and O-RAN RUs (O-RUs) 340, respectively.

In some aspects, the DUs 330 and the RUs 340 may be implemented according to a functional split architecture in which functionality of a base station 110 (e.g., an eNB or a gNB) is provided by a DU 330 and one or more RUs 340 that communicate over a fronthaul link. Accordingly, as described herein, a base station 110 may include a DU 330 and one or more RUs 340 that may be co-located or geographically distributed. In some aspects, the DU 330 and the associated RU(s) 340 may communicate via a fronthaul link to exchange real-time control plane information via a lower layer split (LLS) control plane (LLS-C) interface, to exchange non-real-time management information via an LLS management plane (LLS-M) interface, and/or to exchange user plane information via an LLS user plane (LLS-U) interface.

Accordingly, the DU 330 may correspond to a logical unit that includes one or more base station functions to control the operation of one or more RUs 340. For example, in some aspects, the DU 330 may host a radio link control (RLC) layer, a medium access control (MAC) layer, and one or more high physical (PHY) layers (e.g., forward error correction (FEC) encoding and decoding, scrambling, and/or modulation and demodulation) based at least in part on a lower layer functional split. Higher layer control functions, such as a packet data convergence protocol (PDCP), radio resource control (RRC), and/or service data adaptation protocol (SDAP), may be hosted by the CU 310. The RU(s) 340 controlled by a DU 330 may correspond to logical nodes that host RF processing functions and low-PHY layer functions (e.g., fast Fourier transform (FFT), inverse FFT (iFFT), digital beamforming, and/or physical random access channel (PRACH) extraction and filtering) based at least in part on the lower layer functional split. Accordingly, in an O-RAN architecture, the RU(s) 340 handle all over the air (OTA) communication with a UE 120, and real-time and non-real-time aspects of control and user plane communication with the RU(s) 340 are controlled by the corresponding DU 330, which enables the DU(s) 330 and the CU 310 to be implemented in a cloud-based RAN architecture.

As indicated above, FIG. 3 is provided as an example. Other examples may differ from what is described with regard to FIG. 3.

Some wireless communications systems support wireless communications at high frequencies (e.g., mmW or sub-THz). The short wavelengths at high frequencies enable the possibility of MIMO channels in LOS situations. In some cases, a transmission antenna array can transmit signals to a reception antenna array along different directions (e.g., using different precoders). In order to determine precoders for LOS MIMO communications using rectangular antenna arrays, network nodes can be required to solve complex, higher-order channel matrices associated with the rectangular antenna arrays. These higher-order channel matrices can have many degrees of freedom, which require extensive processing capabilities that are unable to be performed by some lower-complexity network nodes. Moreover, determining precoders for LOS MIMO communications based on these higher-order channel matrices can be computationally expensive, which can increase power consumption and reduce battery life at the network node.

In some cases, network nodes of a wireless communications system support techniques which enable network nodes to determine precoders for LOS MIMO communications using rectangular antenna arrays. For example, in some cases, network nodes can implement techniques for decomposing higher-order channel matrices into smaller sub-matrices which may be computationally easier for network nodes to solve. For example, a reception network node of a wireless communications system can receive a request for beamforming information from a transmission network node for LOS MIMO communications between the respective network nodes. For example, the transmission network node can request for the reception network node to determine precoders which will be used for the LOS MIMO communication between the respective network nodes.

Continuing with the same example, the reception network node can determine a channel estimation matrix between the network nodes, and can decompose the channel estimation matrix into x-dimension and y-dimension sub-matrices corresponding to the x and y dimensions of the channel estimation matrix. In some cases, a size/order of the channel estimation matrix can be dependent on a relative size/order of rectangular antenna arrays at both of the network nodes, respectively. Decomposing the channel estimation matrix can enable the reception network node to generate smaller sub-matrixes which exhibit symmetry (e.g., symmetric Toeplitz matrices), effectively reducing the degrees of freedom of the sub-matrices and allowing for less computationally-expensive solving. As a result, the reception network node can leverage the symmetric nature of the sub-matrices to simplify the determination of the precoders based on the sub-matrices, and can transmit the determined precoders back to the transmission network node for the LOS MIMO communications. The transmission network node can then transmit the LOS MIMO communication to the reception network node using the indicated precoders.

In some cases, by decomposing a channel estimation matrix into symmetric sub-matrices, a reception network node can reduce a quantity of eigenvectors, and therefore precoders, that the reception network node must solve for the LOS MIMO communications. For example, the reception network node can reduce an N dimensional problem to an N/2 dimensional problem, effectively reducing the quantity of eigenvectors that must be solved by half. Moreover, by simplifying the processing of symmetric sub-matrices, the reception network node can retain quadradic terms within the channel estimation matrix while performing paraxial approximations, thereby improving the accuracy of precoder determination, which may lead to more efficient and reliable LOS MIMO communications.

Figure 4:
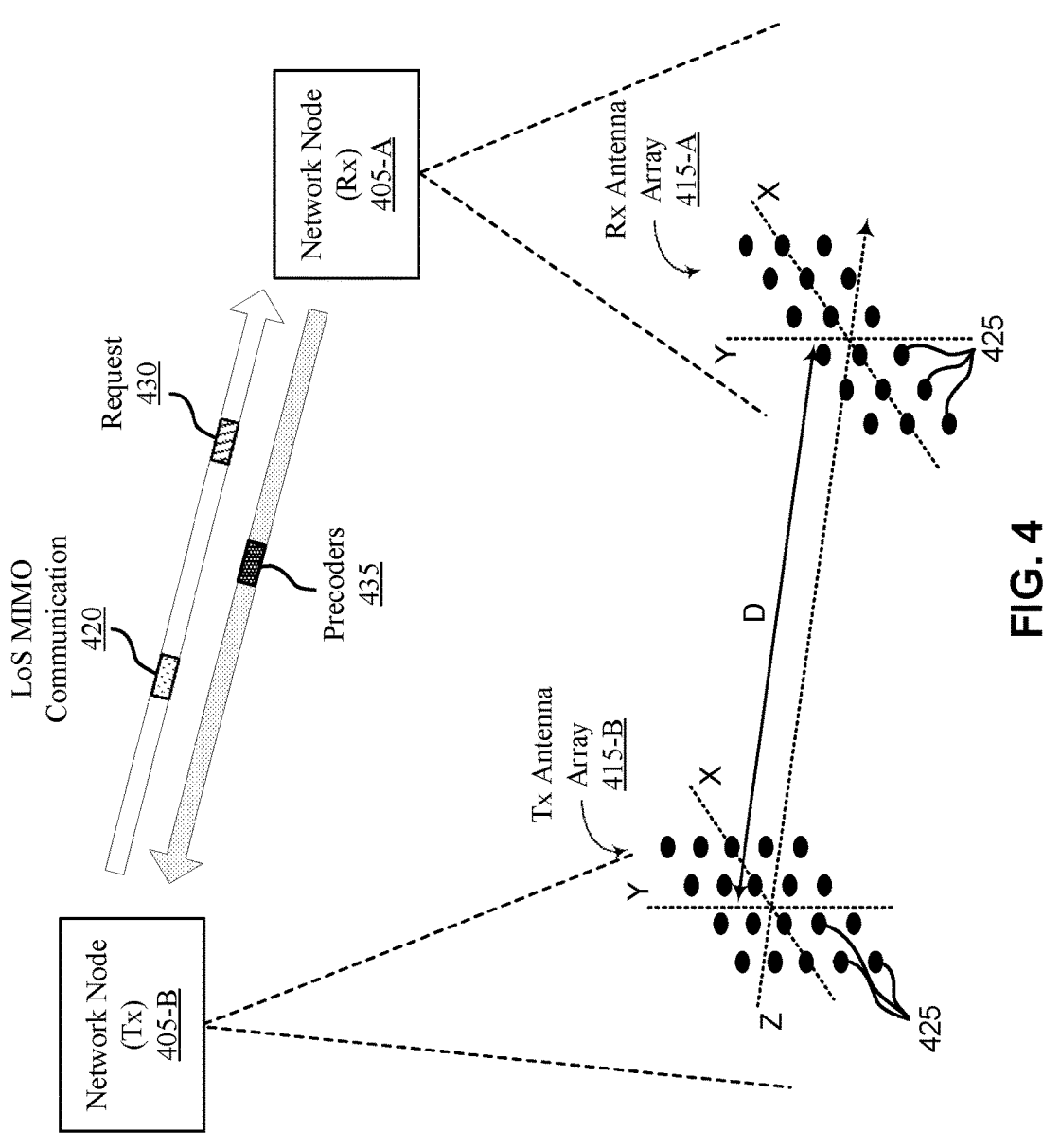
FIG. 4 illustrates an example of a wireless communications system that supports techniques for line-of-site (LOS) multiple input multiple output (MIMO communications using rectangular antenna arrays in accordance with the present disclosure.

FIG. 4 illustrates an example of a wireless communications system 400 that supports techniques for LOS MIMO communications using rectangular antenna arrays in accordance with the present disclosure. In some examples, wireless communications system 400 can implement, or be implemented by, aspects of wireless communications system 100.

The wireless communications system 400 can include a network node 405-a and a network node 405-b, which can be examples of base stations 110, UEs 120, and/or other wireless devices as described with reference to FIGS. 1 and 2. The wireless communications system 400 can support wireless communications at high frequencies (e.g., mmW or sub-THz). The short wavelengths at high frequencies enable the possibility of MIMO channels in LOS situations. In other words, a transmission antenna array (e.g., Tx antenna array 415-b) can transmit signals to a reception antenna array (e.g., Rx antenna array 415-a) along different directions (e.g., using different precoders). Some wireless communications systems 400 can support LOS MIMO communications 420 in accordance with two antenna arrangement configurations: orbital angular momentum (OAM) configurations, and rectangular configurations. In the context of OAM configurations, Tx and Rx antennas are arranged in multiple concentric circles. Comparatively, in the context of rectangular configurations, antenna elements 415 (which may be referred to herein as "antennas") are arranged into rectangular antenna arrays. For example, as shown in FIG. 4, the network node 405-A includes a rectangular antenna array 415-A, and the network node 415-B includes a rectangular antenna array 415-B. The respective rectangular antenna arrays 415 can include sets of antennas 425 which are arranged into rows and columns. Rectangular antenna arrays 135 can enable better utilization of antenna panel space, as most antenna panels are rectangular in shape. Moreover, rectangular antenna arrays 415 can enable total separability of the two dimensions (e.g., x-dimension, y-dimension) in channel matrix processing and feedback.

In some cases, the network node 405-A can receive a request 430 for beamforming information associated with LOS MIMO communications 420 from the network node 405-B to the network node 405-A. For example, the network node 405-B can transmit the request 430 for the network node 405-A to perform channel estimation techniques and determine precoders 435 which will be used by the network node 405-B to transmit LOS MIMO communications 420 to the network node 405-A.

As shown in FIG. 4, the antenna arrays 415-A, 415-B can include two-dimensional (e.g., x-dimension, y-dimension), co-polarized antenna arrays which face one another (Tx and Rx). The Tx antenna array 415-B can include $N_x \times N_y$ transmission antenna elements, whereas the Rx antenna array 415-a can include $M_x \times M_y$ reception antennas. The respective antenna arrays 415-A, 415-B can be parallel to one another in some cases, but need not be parallel. In some cases, and for the purposes of illustration, the centers of the respective antenna arrays 415-A, 415-B can be aligned and separated by a distance D, as shown in FIG. 4. For cases in which D»apertur, where apertur is the diameter of the antenna aperture (e.g., for intermediate to far-field implementations), optimal precoders can be used for the Tx side (e.g., network node 405-B) and can exploit the structures in the MIMO modes between the respective antenna arrays 415 to reduce a complexity of operations for determining precoders.

Based on the theory of Green's function (e.g., waveform from a single point source with the same boundary condition), the Helmholtz equation $\nabla^2 v + k^2 v = 0$ can be solved in an integral form, which is the equivalent to the Huygens-Fresnel principle. The signal at the receiver plane v (e.g., at the Rx antenna array 415-A) can be written as a function of a transmitter signal u, as illustrated in Equation 1 below:

$$v = \int u \frac{\exp(jkr)}{r} \psi d \tag{1}$$

where $\psi = \cos \theta$ (or some other function of the angle of propagation close to $\cos \theta$).

In some cases, $\psi$ can be approximated to be close to 1 (e.g., $\psi \approx 1$). This integral form of Equation 1 can be easy for simulation, but it does not correspond to a solution form, especially when the transceivers (e.g., antenna elements of the respective antenna arrays 415) are discrete units. Moreover, eigenmodes of Equation 1 must be found by singular value decomposition (SVD) of the transfer matrix, which can require a conjecture that one or more Gaussian terms are present in the eigenvectors.

Maxwell equations as vector equations, in free space without any free charge, can be solved by a scalar form including the Helmholtz equation above. Assuming a paraxial wave $v = u e^{ikz}$ and assuming the variation of amplitude u in the z direction is slow, and dropping the term $$\frac{\partial^2}{\partial z^2} u,$$

the Helmholtz equation becomes Equation 2 below:

$$i \frac{\partial}{\partial z} u = -\frac{1}{2k} \left( \frac{\partial^2}{\partial x^2} + \frac{\partial^2}{\partial y^2} \right) u \tag{2}$$

which can be solved according to a differential solution, or an integral solution, such as Green's function and the Huygens-Fresnel principle.

To derive the transfer matrix H (e.g., channel estimation matrix) between the antenna array 415-A and the antenna array 415-B, it can be illustrative to start from the assumption of OAM antenna configurations with antenna elements arranged in concentric circles with coordinates $(r_n, \theta_n)$ and $(r_m, \theta_m)$. Performing discrete angular sampling in the context of OAM antenna configurations, and assuming N Tx antenna elements and N Rx antenna elements, and ignoring the cosine factor in the amplitude in the Huygens-Fresnel formula, the transfer matrix H between the antenna arrays 410,, can be found according to Equation 3:

$$H_{m,n} \propto \frac{\exp\left(jk\sqrt{z^2 + (r_1\cos\theta_1 - r_2\cos\theta_2)^2 + (r_1\sin\theta_1 - r_2\sin\theta_2)^2}\right)}{\sqrt{z^2 + (r_1\cos\theta_1 - r_2\cos\theta_2)^2 + (r_1\sin\theta_1 - r_2\sin\theta_2)^2}} \tag{3}$$

which may be simplified to yield Equation 4:

$$H_{m,n} \propto \frac{\exp\left\{jk\sqrt{z^2 + r_1^2 + r_2^2 - 2r_1r_2\cos(\theta_1 - \theta_2)}\right\}}{\sqrt{z^2 + r_1^2 + r_2^2 - 2r_1r_2\cos(\theta_1 - \theta_2)}}. \tag{4}$$

Referring to the rectangular antenna arrays 415-A, 415-B of the wireless communications system 400, the channel (channel estimation matrix H) between the Tx antenna elements of the second antenna array 415-B ($x_i, y_j$) and the Rx antenna elements of the first antenna array 415-A ($x_p, y_q$) can be defined by converting the polar coordinates of Equation 4 above into rectangular coordinates, which yields Equation 5 below:

$$H_{x_i, y_i, x_p, y_q} \sim \frac{\exp\left(-i2\pi\dfrac{dx_iy_j, \, x_py_q}{\lambda}\right)}{dx_iy_j, \, x_py_q}. \tag{5}$$

In some cases, the network node 405-$a$ can determine the channel estimation matrix $H_{x_iy_i,x_py_q}$ for the channel between the respective antenna arrays 415 in response to receiving the request 430.

Referring to the channel estimation matrix of Equation 5 above for rectangular antenna arrays, the x-dimension and the y-dimension can be totally separated, reducing the ($N_x \times N_y$)$\times M_x \times M_y$) matrix to two smaller sub-matrices (1) $N_x \times M_x$ (x-dimension), and (2) $N_y \times M_y$ (y-dimension). According to some techniques, by decomposing higher-order channel matrices (e.g., H) into smaller sub-matrices (e.g., x- and y-dimension sub-matrices), eigenvectors (beamforming pre-coders) and eigen-values (mode strength) can be calculated and fed back to Tx devices (e.g., network node 405-B) separately. Each respective eigenvector can correspond to a respective eigenvalue. Moreover, the channel matrix for each of the respective sub-matrices for each dimension/axis can include symmetric Toeplitz matrices. Symmetric Toeplitz matrices can imply an important property of precoders for LOS MIMO communications in that roughly half of the precoders for each respective sub-matrix are symmetric, and the other half anti-symmetric. As a result, the symmetric nature of the sub-matrices can effectively reduce the degrees of freedom of the sub-matrices by reducing the effective size of the channel estimation matrix to a quarter of the overall channel estimation matrix: half of the quantity of rows of the rectangular antenna arrays 415-A, 415-B and half of the quantity of columns of the rectangular antenna arrays 415-A, 415-B.

Performing further paraxial approximation of Equation 5 above yields Equation 6:

$$H_{x_iy_i,x_py_q} \sim \frac{\exp\left(-i2\pi\dfrac{dx_iy_j, \, x_py_q}{\lambda}\right)}{dx_iy_j, \, x_py_q} \approx \frac{\exp\left(-i2\pi\dfrac{dx_iy_j, \, x_py_q}{\lambda}\right)}{z} \tag{6}$$

which may be further simplified to Equation 7 through Equation 10 below:

$$H_{x_iy_j,x_py_q} = \frac{\exp\left[\dfrac{-i2\pi}{\lambda}\sqrt{z^2 + (x_i - x_p)^2 + (y_j - y_q)^2}\right]}{z} \tag{7}$$

$$\approx \frac{\exp\left[\dfrac{-i2\pi}{\lambda}\left(z + \dfrac{(x_i - x_p)^2}{2z} + \dfrac{(y_j - y_q)^2}{2z}\right)\right]}{z} \tag{8}$$

$$= \frac{\exp\left(\dfrac{-i2\pi z}{\lambda}\right)}{z}\exp\left[\dfrac{-i2\pi(x_i - x_p)^2}{\lambda z}\right]\exp\left[\dfrac{-i2\pi(y_j - y_q)^2}{\lambda z}\right] \tag{9}$$

$$\sim \exp\left[\dfrac{-i2\pi(x_i - x_p)^2}{\lambda z}\right]\exp\left[\dfrac{-i2\pi(y_j - y_q)^2}{\lambda z}\right]. \tag{10}$$

The channel estimation matrix $H_{x_iy_i,x_py_q}$ for the channel between the antenna array 415-A and the antenna array 415-B (as illustrated by Equations 6-10 above) is represented in tensor notation. Further, the x-dimension and the y-dimension of the channel estimation matrix $H_{x_iy_i,x_py_q}$ are totally separable, as shown in Equation 11 below:

$$H_{x_iy_j,x_py_q} = H_{x(i,p)} \otimes H_{y(j,q)}. \tag{11}$$

In some aspects, the network node 405-A can determine the first sub-matrix $H_{x(i,p)}$ and the second sub-matrix $H_{y(j,q)}$ based on the channel estimation matrix $H_{x_iy_i,x_py_q}$ in accordance with Equations 5-11 above.

The matrices $H_{x(i,p)}$ and $H_{y(j,q)}$ of Equation 11 above are sub-matrices of the channel estimation matrix $H_{x_iy_i,x_py_q}$ associated with the x-dimension and y-dimension, respectively. The eigenvalues and eigenvectors of the matrix $H_{x_iy_i,x_py_q}$ (e.g., $H_{xy}$) are a product (cross-product) of the eigenvalues and eigenvectors of the sub-matrices $H_{x(i,p)}$ and $H_{y(j,q)}$, which may be defined by Equation 11 and Equation 13 below:

$$H_{x(i,p)} \sim \exp\left[\dfrac{-i2\pi(x_i - x_p)^2}{\lambda z}\right] \tag{12}$$

$$H_{y(j,q)} \sim \exp\left[\dfrac{-i2\pi(y_j - y_q)^2}{\lambda z}\right]. \tag{13}$$

To separate the eigen structures of Equation 13 above into the separate x- and y-directions, let $H_xv_x = \mu_xv_x$, $H_yv_y = \mu_yv_y$, and $v_{xy} = v_x \otimes v_y$, which yields Equation 14 through Equation 17 below:

$$H_{xy}v_{xy} = \Sigma x_i\Sigma y_j\Sigma x_p\Sigma y_q H_{x_iy_j,x_py_q}v_{x_iy_i,x_py_q} \tag{14}$$

$$= \Sigma_{x_i}\Sigma_{y_j}\Sigma_{x_p}\Sigma_{y_q}H_{x(i,p)}H_{y(j,q)}v_{x(i,p)}v_{y(j,q)} \tag{15}$$

$$= \Sigma_{x_i}\Sigma_{x_p}H_{x(i,p)}v_{x(i,p)}\Sigma_{y_j}\Sigma_{y_q}H_{y(j,q)}v_{y(j,q)} \tag{16}$$

$$= \mu_x\mu_yv_x \otimes v_y. \tag{17}$$

The equations above assume perfect alignment between the antenna array 415-A and the second antenna array 415-B. In other words, the equations assume that the centers of the respective antenna arrays 415 are aligned along the z-axis, and that the respective x axes are parallel to each other, the respective y axes are parallel to each other, and the x axes are perpendicular to the z-axis. However, these conditions are not always met in practice. For example, in $$\left\lfloor \frac{N}{2} \right\rfloor$$

some cases, the Tx and Rx antenna arrays 415 can be parallel to one another and perpendicular to the z-axis, but the centers of the respective antenna arrays 415 may not be aligned. That is, the center of the Rx antenna array 415-A can be positioned at $(X_0, Y_0)$, which is offset relative to the Tx antenna array 415-B and/or the z-axis illustrated in FIG. 4. This may be due to imperfect alignment, or an intentional design choice to allow for different heights and/or positions between the respective antenna arrays 415. In such cases, the separation of the channel estimation matrix from Equation 11 above (e.g., $H_{x_i y_i, \; x_p y_q} = H_{x(i,p)} \otimes H_{y(j,q)}$) is still valid. Moreover, the sub-matrices for the x- and y-dimensions ($H_{x(i,p)}$, $H_{y(j,q)}$) from Equations 12 and 13 are still symmetric Toeplitz matrices. However, the expression for the matrix elements can be more complicated. In cases where the centers of the antenna arrays 415 are not aligned, the equations above may still be valid, but more computationally intensive to solve.

The respective sub-matrices $H_{x(i,p)}$ and $H_{y(j,q)}$ for the x-dimension and the y-dimension can be further illustrated as symmetric Toeplitz matrices. For example, assuming $N_x$ of the Tx antenna array 415-B is equal to $M_x$ of the Rx antenna array 415-A (e.g., $N_x = M_x = N$), and assuming that $$H_{x(i,p)} \sim \exp\left[\frac{-i2\pi(x_i - x_p)^2}{\lambda z}\right]$$

is a symmetric Toeplitz matrix, the Tx and Rx elements can be positioned on a regular grid, namely, $x_i = i d_x$. Let $$\rho = \exp\left[\frac{-i2\pi d_x^2}{\lambda z}\right],$$

and the sub-matrix $H_x$ of the channel estimation matrix $H_{xy}$ can be represented according to Equation 18 below:

$$H_x = \begin{pmatrix} 1 & \rho & \rho^4 & \rho^9 & \dots & \rho^{(N-1)^2} \\ \rho & 1 & \rho & \rho^4 & \dots & \rho^{(N-2)^2} \\ \rho^4 & \rho & 1 & \rho & \dots & \rho^{(N-3)^2} \\ \rho^9 & \rho^4 & \rho & 1 & \dots & \rho^{(N-4)^2} \\ \vdots & \vdots & \vdots & \vdots & \ddots & \vdots \\ \rho^{(N-1)^2} & \rho^{(N-2)^2} & \rho^{(N-3)^2} & \rho^{(N-4)^2} & \dots & 1 \end{pmatrix} \quad (18)$$

As can be seen in Equation 18 above, the sub-matrices $H_x$, $H_y$ of the channel estimation matrix $H_{xy}$ can include symmetric Toeplitx matrices. This can greatly simplify the computational complexity for solving the eigenvectors/precoders of the sub-matrices, where each respective eigenvector/precoder corresponds to a respective eigenvalue. For example, if $H_x$ has N distinct eigenvectors (among the N eigenvectors), $$\left\lfloor \frac{N+1}{2} \right\rfloor$$

eigenvectors/precoders are symmetric with respect to the center of the sub-matrix and/or rectangular antenna array 415, where the other eigenvectors/precoders are anti-symmetric with respect to the center. The Gaussian-Hermite solution satisfies this property. In effect, by decomposing the channel estimation matrix $H_{xy}$ between the rectangular antenna arrays 415-A, 415-B into symmetric sub-matrices $H_x$, $H_y$, an N dimensional problem can be solved (e.g., by the network node 405-A) as an N/2 dimensional problem, effectively reducing the computational complexity (and processing resources) required to solve for the respective precoders for LOS MIMO communications. In other words, the symmetric Toeplitz properties of the sub-matrices may enable the network node 405-A to solve the eigenvectors/precoders of the sub-matrices in a less computationally intensive manner, which may reduce a complexity at the network node 405-A and reduce processing power and resources required to solve for the precoders/eigenvectors.

For example, assuming alignment between the Rx antenna array 415-A and the Tx antenna array 415-B, and assuming N=2, it can be found that $\mu = 1 \pm \rho$ and $v = (1, \pm 1)^T$. Similarly, assuming alignment between the Rx antenna array 415-a and the Tx antenna array 415-B, and assuming N=3, it can be found that $\mu_1 = 1 - \rho$ and $v_1 = (1, 0, -1)^T$ and $$\mu_{2,3} = 1 + \frac{\rho^4}{2} \pm \sqrt{\frac{\rho^8}{4} + 2\rho^2}$$

and $v_{2,3} = (1, \pm\sqrt{1+8\rho^{-6}} - 1, 1)^T$. Further, assuming alignment between the Rx antenna array 415-A and the Tx antenna array 415-B, and assuming N=4, solving the two-dimensional problem for $\mu$ and x (with four solutions) yields Equation 19:

$$\begin{bmatrix} 1-\mu & \rho & \rho^4 & \rho^9 \\ \rho & 1-\mu & \rho & \rho^4 \\ \rho^4 & \rho & 1-\mu & \rho \\ \rho^9 & \rho^4 & \rho & 1-\mu \end{bmatrix} \begin{bmatrix} 1 \\ x \\ \pm x \\ \pm 1 \end{bmatrix} = 0. \quad (19)$$

Continuing with reference to Equation 19 for the case in which N=4, only the first two equations are independent, as shown in Equation 20 and Equation 21 below:

$$(1 - \mu) + \rho x \pm \rho^4 x \pm \rho^9 = 0 \quad (20)$$

$$\rho + (1 - \mu)x \pm \rho x \pm \rho^4 = 0 \quad (21)$$

Solving for $\mu$ and x yields equations Equation 22 through Equation 25 below:

$$\mu_{1,2} = 1 - \frac{1}{2}\left\{-\rho(1+\rho^8) \pm \sqrt{\rho^2(1+\rho^8)^2 - 4[\rho^{10} - \rho^2(1+\rho^3)^2]}\right\} \quad (22)$$

$$x_{1,2} = -\frac{(1-\mu)+\rho^9}{\rho(1+\rho^3)} \quad (23)$$

$$\mu_{3,4} = 1 - \frac{1}{2}\left\{\rho(1+\rho^8) \pm \sqrt{\rho^2(1+\rho^8)^2 - 4[\rho^{10} - \rho^2(1-\rho^3)^2]}\right\} \quad (24)$$

-continued $$x_{3,4} = -\frac{(1-\mu)-\rho^9}{\rho(1-\rho^3)}. \quad (25)$$

Additionally, or alternatively, μ and x may be defined according to Equation 26 and Equation 27 below:

$$\mu = 1 - \frac{1}{2}\left\{\mp\rho(1+\rho^7) \pm \sqrt{\rho^2(1+\rho^8)^2 - 4[\rho^{10} - \rho^2(1\pm\rho^3)^2]}\right\} \quad (26)$$

$$x = -\frac{(1-\mu)\pm\rho^9}{\rho(1\pm\rho^3)}. \quad (27)$$

Continuing with the derivation to solve for μ may result in Equation 28:

$$\mu = 1 + \frac{1}{2}\left\{\pm\rho(1+\rho^7) \pm \sqrt{\rho^2(1+\rho^8)^2 - 4[\rho^{10} - \rho^2(1\pm\rho^3)^2]}\right\} \quad (28)$$

where the "±" operator between the $\pm\rho(1+\rho^8)$ term and the quadradic and square root term is independent from the other "±" operators. Specifically, the "±" operator between the $\pm\rho(1+\rho^8)$ term and the quadradic and square root term is from the two roots of a quadratic equation, whereas the other "±" operators within Equation 28 are from the symmetry and anti-symmetry of the eigenvectors/precoders of the sub-matrices.

Upon determining the precoders/eigenvectors for the LOS MIMO communication 420 based on the sub-matrices, the network node 405-A can transmit, to the network node 405-B, an indication of a set of precoders 435 which are to be used for the LOS MIMO communication 420. For example, the network node 405-A can transmit an indication of the eigenvectors/precoders 435 which were determined based on the symmetric Toeplitz sub-matrices. Subsequently, the network node 405-B can transmit the LOS MIMO communication 420 using the rectangular antenna array 415-B and the indicated set of precoders 435.

As indicated above, FIG. 4 is provided as an example. Other examples may differ from what is described with regard to FIG. 4.

As discussed above, various wireless communication schemes, such as LOS MIMO, are being considered for advanced wireless communication systems (for example, 6G wireless communication systems) to, for example, support high throughput over short distances. In such environments, the respective antenna arrays of the two network nodes can be installed such that they are aligned along a first axis (for example, a horizontal axis or a vertical axis) as well as rotationally (for example, such that respective antenna elements of an antenna array of one network node are aligned with respective antenna elements of an antenna array of the other network node in various rotational axes). It can be important that the two antenna arrays are aligned to support wireless communication, such as LOS MIMO, regardless of the type of antenna arrays implemented (e.g., whether OAM arrays or rectangular arrays are used). With any misalignment (for example, axial misalignment or rotational misalignment), between respective antenna arrays of two network nodes, modes in OAM LOS MIMO between the network nodes may lose orthogonality, which may result in signal loss, among other disadvantages.

In some cases, a network node can be configured to determine two or more misalignment conditions (for example, a linear offset and one or more rotational angle offsets) associated with an antenna array of a receiving device and an antenna array of a transmitting device, and to precompensate for these misalignment conditions, such as in a sequential manner. In some cases, the receiving device can report the misalignment conditions to the transmitter device, which can then use one or more precompensation techniques, such as beamforming. First, the receiving device can estimate a linear offset between an antenna array of the receiving device and an antenna array of the transmitting device based on phase measurements of a first set of reference signals transmitted by the antenna array of the transmitting device and received by an antenna of the antenna array of the receiving device. The receiving device can transmit or otherwise provide an indication of the linear offset to the transmitting device, which can apply precompensation to its antenna array to counter the linear offset. The receiving device can also estimate one or more rotational offsets based on phase measurements of a second set of reference signals transmitted between two or more antennas of the transmitting antenna array and two or more antennas of the receiving antenna array, referred to as "transmit-receive antenna pairs," which can in some examples be on or relatively near a peripheral edge of the antenna array. The receiving device can then transmit an indication of the one or more rotational offsets to the transmitting device. In some examples, the receiving device can transmit indications of the linear offset and the one or more rotational angles together. In some other examples, the receiving device can transmit the indication of the linear offset first and then subsequently transmit the indication of the rotational offset(s). The transmitting device can then apply further precompensation to its antenna array (e.g., using beam steering or other mechanisms, as needed, to counter the one or more rotational offsets).

Figure 5:
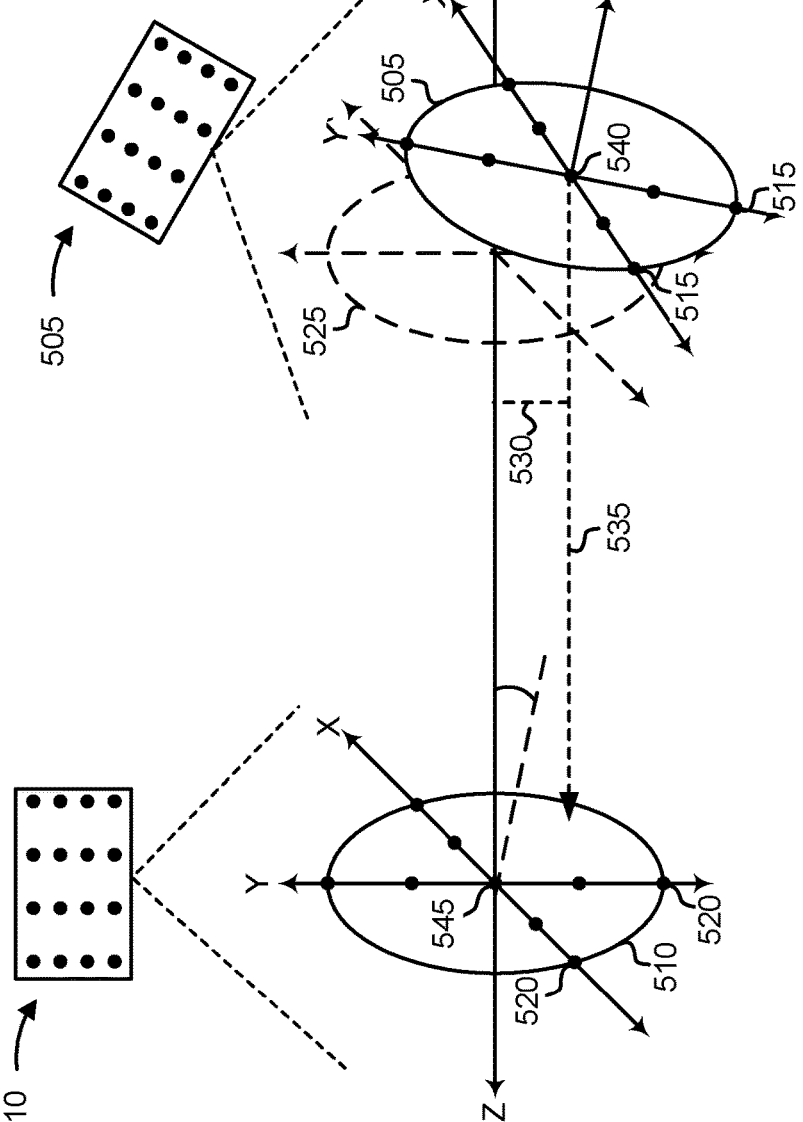
FIG. 5 illustrates an example of an antenna array configuration that supports phase pre-compensation for misalignment in accordance with the present disclosure.

FIG. 5 illustrates an example of an antenna array configuration 500 that supports phase pre-compensation for misalignment in accordance with the present disclosure. The antenna array configuration 500 can implement aspects of or be implemented by the wireless communications system 100. The antenna array configuration 500 can include a first antenna array 505 associated with a first network node and a second antenna array 510 associated with a second network node. In some aspects, the first network node or the second network node (or both) may be a UE or a base station (or some combination), which may be examples of the corresponding devices described herein.

LOS MIMO deployment scenarios can include the first network node installing, establishing, or otherwise configuring the first antenna array 505, and the second network node installing, establishing, or otherwise configuring the second antenna array 510 such that each antenna array is coplanar with respect to the other antenna array. That is, each antenna array can include a plurality of antennas (for example, antennas 515 of the first antenna array 505 and antennas 520 of the second antenna array 510). Each antenna array can have a circular shape, rectangular shape, oval shape, or square shape, among other examples. The aim of installing such antenna arrays is that the planar face of each antenna array is perfectly coplanar with respect to the planar face of the other antenna array along the z axis, and is rotated such that each antenna is aligned with a corresponding antenna of the other antenna array (for example, antenna pairs) along the x and y axis (for example, are rotated similarly around the z axis). This can support Fresnel diffraction, which can be key to the presence of multiple channels supporting the MIMO communications with LOS.

Alignment of the receiving plane to the transmitting plane (for example, alignment of the planar face of the first antenna array 505 and the second antenna array 510) is an important aspect for such LOS MIMO schemes, regardless of whether OAM (for example, concentric circles) or rectangular antenna arrays are used. Without such alignment, the modes in OAM and LOS MIMO lose orthogonality with respect to each other, thus disrupting communications. Typically, misalignment of the first antenna array 505 and the second antenna array 510 is common (at least initially), and therefore an alignment procedure is useful before the communications sessions are established between the first network node and the second network node. Misalignment in some scenarios may include a linear offset (for example, linear off-axis) in which the planar faces of the antenna arrays are offset along the z axis) and/or rotational offset(s) in which the planar face of the antenna arrays are rotated around the z axis or the planar face of one antenna array is tilted or otherwise leans such that it is not parallel to the planar face of the other antenna array. Accordingly, various degrees of freedom can be present in the misalignment of the antenna arrays corresponding to the linear axis or the rotational offset(s) or both. If such misalignment is present, the transformation matrix has numerous variables that are tangled together, which makes it difficult to analyze or correct (or both) for the misalignment between the first antenna array 505 and the second antenna array 510.

One example of such misalignment is illustrated in the antenna array configuration 500 of FIG. 5. In this example, the second antenna array 510 is configured as shown, such that the planar face of the second antenna array 510 is perpendicular to the z axis and rotated such that the antennas 520 are positioned along the x and y axis. An ideal placement for the first antenna array 505 is illustrated in dashed lines as antenna array placement 525. That is, antenna array placement 525 illustrates the ideal alignment of the first antenna array 505 with respect to the second antenna array 510. However, in the example illustrated in FIG. 5, there is misalignment between the first antenna array 505 and the second antenna array 510. For example, the misalignment includes the first antenna array 505 being positioned a distance from the z axis, and therefore having a corresponding linear offset 530. That is, a transmission 535 from a center antenna element 540 of the first antenna array 505 may not align with the corresponding center antenna element 545 of the second antenna array 510.

Additionally, the first antenna array 505 is rotated about the z axis such that the x and y axes of the first antenna array 505 are not aligned with the corresponding x and y axes of the second antenna array 510. Furthermore, the first antenna array 505 is tilted along the x y axes such that the planar face of the second antenna array 510 is not parallel with the planar face of the first antenna array 505. Again, if such misalignment is present, the variables of the transformation matrix are tangled to such a degree that analyzing or otherwise quantifying the misalignment between the second antenna array 510 and the first antenna array 505 is extremely difficult, and potentially sometimes prohibitively difficult. For example, it may not be feasible to have a reasonably sized set of codewords to use for pre-compensation due to the high dimensions (for example, due to the numerous degrees of freedom between the antenna arrays' misalignment). Moreover, physical alignment of the second antenna array 510 to the first antenna array 505 may be difficult in some mobility use cases. Finally, in some situations it may be impractical to physically place a lens (or other physical alignment aid) between the second antenna array 510 and the first antenna array 505 to aid in alignment.

Accordingly, a network node can use a sequential method to find and apply accurate phase pre-compensation at the transmitting device (for example, the second device 510 in this example) to compensate for the linear axis offset as well as the rotational offset(s) between the second antenna array 510 and the first antenna array 505. Broadly, the linear axis offset (for example, the off-axis offset) is initially estimated based on phase measurements at the center antenna arrays along the x and y axes using a reference signal transmitted from the second device. After the linear offset has been estimated and compensated for, the rotational offsets are then estimated and compensated for using multiple reference signals transmitted from antennas 520 of the second antenna array 510 (e.g., peripheral antennas). For example, the rotational offset(s) are estimated based on phase measurements among the antenna pairs along the x and y axes using reference signals transmitted from the corresponding antenna array antennas. Accordingly, the phase terms from the rotational offsets are no longer tangled with the linear offset, which supports sequentially estimating and correcting for the linear offset or rotational offset(s) (or both). FIG. 5 illustrates examples of the linear offset estimation/pre-compensation aspects of the described techniques, with FIGS. 6A and 6B illustrating examples of the rotational offset(s) estimation/pre-compensation aspects of the described techniques.

To facilitate estimation and pre-compensation, the second antenna array 510 can transmit a first set of reference signals (for example, one or more reference signals). Broadly, the first set of reference signals can be transmitted from a central or center antenna element 545 of the second antenna array 510. The first set of reference signals can be transmitted to a corresponding central or center antenna element 540 of the first antenna array 505 (for example, the corresponding antenna pair). Accordingly, the first network node can measure a first phase of each reference signal in the first set of reference signals (e.g., one or more first phases). Based on the first phase(s) measured by the first network node, the first network node can then estimate the linear offset between the first antenna array 505 and the second antenna array 510. In some examples, the first network node can estimate differences in distances between pairs of corresponding Tx and Rx antennas based on the phase measurements in order to determine the linear offsets.

In some cases, rectangular coordinates can be used for the algorithms, although the results can be easy applicable to OAM and polar coordinates. The coordinates for the reception plane (for example, for the first antenna array 505) can have their origin at $(X_0, Y_0, Z_0)$ and $(-\gamma,-\beta,-\alpha)$ with respect to the X-, Y-, and Z-axes. The coordinates for the transmission plane (for example, for the second antenna array 510) can be at a rotational offset of $(\gamma, \beta, \alpha)$ with respect to the Z-, Y-, and X-axes, respectively.

With respect to a coordinate transform (for example, with respect to the rotation matrix), a point with receive plane coordinates of $(x', y', z')$ has its coordinates in the transmit plane as according to Equation (29) below:

$$\begin{bmatrix} x \\ y \\ z \end{bmatrix} = \begin{bmatrix} x_0 \\ y_0 \\ z_0 \end{bmatrix} + \begin{bmatrix} \cos\alpha\cos\beta & \cos\alpha\sin\beta\sin\gamma - \sin\alpha\cos\gamma & \cos\alpha\sin\beta\cos\gamma + \sin\alpha\sin\gamma \\ \sin\alpha\cos\beta & \sin\alpha\sin\beta\sin\gamma + \cos\alpha\cos\gamma & \sin\alpha\sin\beta\cos\gamma - \cos\alpha\sin\gamma \\ -\sin\beta & \cos\beta\sin\gamma & \cos\beta\cos\gamma \end{bmatrix} \begin{bmatrix} x' \\ y' \\ z' \end{bmatrix} \tag{29}$$

In a direction solution approach to estimating/compensating for the misalignment, the coordinates $X_0$, $Y_0$, $Z_0$, $\gamma$, $\beta$, $\alpha$ leave six unknown variables to solve for, which can be difficult to solve for given the degree of freedom between the antenna arrays. However, the network node can utilize an iterative approach to solve for these variables, to pre-compensate for the misalignment between the first antenna array 505 and the second antenna array 510. This can include making the transmission plane (for example, the second antenna array 510) appear as (x", y", z") to the reception plane (for example, the first antenna array 505).

In some cases, the first network node can measure a first phase of each reference signal on the first set of reference signals. The first network node can project the origin of the reception plane to the transmission plane along the z axis (for example, corresponding to the linear offset 530). Estimating the linear offset 530 can include the measuring (for example, based on the first phase distance) the distance between a first antenna and a second antenna along the linear axis that is perpendicular to the plane of the second antenna array 510. For example, this may include the distance between the reception plane (0,0,0) and the transmission plane ($k_x$, $d_x$,0,0)—distance between the reception plane (0,0,0) and the transmission plane (0,0,0).

In some aspects, the distance between the reception plane (0,0,0) (for example, the center of the first antenna array 220) and the transmission plane ($k_x$, $d_x$,0,0)—the distance between the reception plane (0,0,0,) and the transmission plane (0,0,0) can be as according to Equation (30) below:

$$\approx \frac{-2k_x d_x x_0 + k_x^2 d_x^2}{2z_0}. \tag{30}$$

The distance between the reception plane (0,0,0) and the transmission plane ($k_y$, $d_y$,0,0)—the distance between the reception plane (0,0,0) and the transmission plane (0,0,0) can be as according to Equation (31) below:

$$\frac{-2k_y d_y y_0 + k_y^2 d_y^2}{2z_0}. \tag{31}$$

The reception plane (0,0,0) can be the same as $(X_0, Y_0, Z_0)$ in the transmit plane coordinates. With $d_x$ and $d_y$ known, the given observations at multiple $k_x$ and $k_y$, $x_0$, $y_0$, and $z_0$ can be solved (for example, using linear regression). To remove phase ambiguity (for example, based on $2\pi$), the network node can use dense frequency sampling of the reference signal, or can use extra units close to the origin (for example, additional centrally located antenna elements), or both, for phase de-ambiguity because multiple modes may use Equation (32) below:

$$\frac{d_{max}^2}{\lambda z_0} \sim 1. \tag{32}$$

The multiple transmit units (for example, antenna elements) used for the phase measurements do not have to be equally spaced along the two axes (for example, as long as their respective locations are known to the receive device, such as the second device in this example). As discussed, reference signals can be used for the transmitting units (for example, the antenna elements) to support the phase measurements (for example, measurement of the first phase), with each unit being along the two axes (for example, the x and y axes).

In one alternative, the linear offset may be estimated according to the distance between the reception plane (0,0,0) and the transmission plane ($k_x$,$d_x$,0,0)—the distance between the reception plane (0,0,0) and the transmission plane ($-k_x$,$d_x$,0,0) being according to Equation (33) below:

$$\approx \frac{-2k_x d_x x_0}{2z_0}. \tag{33}$$

The distance between the reception plane (0,0,0) and the transmission plane (0,$k_y$,$d_y$,0)—the distance between reception plane (0,0,0) and transmission plane (0,$-k_y$,$d_y$,0) being as according to Equation (34) below:

$$\approx \frac{-2k_y d_y y_0}{2z_0}. \tag{34}$$

With variables $k_x$, $k_y$, $d_x$ and $d_y$ known, the variables $$\frac{x_0}{z_0} \text{ and } \frac{y_0}{z_0}$$

call be solved. The variable $z_0$ by itself may or may not be used for alignment. This alternative also uses reference signals for the transmit units (for example, the antenna elements) used for phase measurements (for example, two units at the far end of each of the two axis).

To remove ambiguity in the phase measurements, the total phase of reference signals (for example, the first set or second plurality of reference signals or both) from (x, y, 0) at sub-carrier $f_1$ can be as according to Equation (35) below:

$$\frac{2\pi f_1 d_{(x,y)}}{c} = \varphi_1(f_1) + m_{1,f_1}(2\pi). \tag{35}$$

The total phase of reference signal from (−x, y, 0) at sub-carrier can be as according to Equations (36) and (37) below:

$$\frac{2\pi f_1 d_{(-x,y)}}{c} = \varphi_2(f_1) + m_{2,f_1}(2\pi), \text{ and} \tag{36}$$

$$\varphi_1(f_1) -_2 (f_1) + \left(m_{1,f_1} - m_{2,f_1}\right)(2\pi) = \frac{2\pi f_1}{c}(d_{(x,y)} - d_{(-x,y)}). \tag{37}$$

Likewise, $$\varphi_1(f_2) - \varphi_2(f_2) + \left(m_{1,f_2} - m_{2,f_2}\right)(2\pi) = \frac{2\pi f_2}{c}\left(d_{(x,y)} - d_{(-x,y)}\right)$$

and $\varphi_1(f_1),\varphi_2(f_2),\varphi_1(f_2)\varphi_2(f_2)$ can be observable by channel estimation based on the reference signal(s), but the unknown integer multiple of $(2\pi)$ is also to be resolved. If multiple of $(2\pi)$ remains in $[\varphi_1(f_1)-\varphi_2(f_1)]-[\varphi_1(f_2)-\varphi_2(f_2)]$, namely, $$\left(m_{1,f_1} - m_{2,f_1}\right) \neq \left(m_{1,f_2} - m_{2,f_2}\right), \left|\frac{2\pi}{c}(f_1 - f_2)(d_{(x,y)} - d_{(-x,y)})\right| \geq 2\pi,$$

which implies $$\left|(d_{(x,y)} - d_{(-x,y)})\right| \geq \frac{c}{|f_1 - f_2|}.$$

In a typical use environment of passive MIMO, reference signals are placed densely in the frequency domain. $|f_1-f_2|$ can be on the order of sub-carrier spacing, or physical resource block size, among other examples. So, it can be assumed that $|f_1-f_2|\sim10^2$ kHz, and then the corresponding ambiguity length $|(d_{(x,y)}-d_{(-x,y)})|\sim10^3$ m, which is sufficient to remove the phase ambiguity. Accordingly, reference signal sampling can include reference signal samples in the frequency domain with a density of the order of $10^2$ kHz, and the reception network node can use multiple sub-carriers in the reference signal to remove phase ambiguity. It can be assumed that phase ambiguity is removed in the estimated differential distance such as $|(d_{(x,y)}-d_{(-x,y)})|$, although $d_{(hd (x,y)}$ and $d_{(-x,y)}$ themselves may still have some degree of ambiguity. Accordingly, the first set of reference signals can be transmitted at a first frequency and the second plurality of reference signals can be transmitted at a second frequency that is within a frequency threshold of the first frequency. Accordingly, the first network node can determine the phase accuracy for the linear offset or the rotational offset(s) (or both) and adjust the first antenna array 505 or the second antenna array 510 (or both) accordingly.

In some cases, the first network node can transmit or otherwise convey an indication of the linear offset to the second network node. The indication can be transmitted along with an indication of the rotational offsets or can be provided initially such that the second network node can adjust communication metric(s) to compensate for the linear offset before measuring and compensating for the rotational offset(s).

In some cases, the second network node can adjust or otherwise modify various metric(s) used for communications between the first antenna array 505 and the second antenna array 510. The alignment procedure may be based on the second network node receiving the indication (for example, feedback) from the first network node indicating the calculated offset of $x_0$ and $y_0$, and $z_0$. The second network node can apply, for $(k_x d_x, k_y d_y)$, an extra phase of the following, in effect steering the beam 235 toward the origin of the receive plane as according to Equation (38) below:

$$-\frac{\pi\left(-2k_x d_x x_0 + k_x^2 d_x^2 - 2k_y d_y y_0 + k_y^2 d_x^2\ k_y^2\right)}{\lambda z_0}. \quad (38)$$

Accordingly, adjusting the metric(s) used for communications between the first antenna array 505 and the second antenna array 510 can include the second network node applying various beam steering, beamforming, and/or other techniques in order to steer a beam from the center of the second antenna array 510 to the first antenna array 505. In some aspects, the second device can adjust a first subset of the metric(s) based on the indication before transmitting a second plurality of reference signals used for rotational offset estimation and measurement.

As indicated above, FIG. 5 is provided as an example. Other examples may differ from what is described with regard to FIG. 5.

FIGS. 6A and 6B illustrate an example of an antenna array configuration 600 that supports phase pre-compensation for misalignment in accordance with the present disclosure. The antenna array configuration 600 can implement aspects of or be implemented by the wireless communications system 100. The antenna array configuration 600 can include a first antenna array 605 associated with a first network node and a second antenna array 610 associated with a second network node.

In some cases, the first network node receives a first set of reference signal(s) and measures a first phase of each reference signal (e.g., one or more first phases for the first set of reference signals) and the first set of reference signal(s). Based on the first phase, the first network node can estimate the linear offset between a first antenna array 605 and the second antenna array 610. The first network node can transmit or otherwise provide an indication of the linear offset to the second network node, which then adjusts various metric(s) (for example, such as beam steering, beamforming, weighting factors) associated with communications between the first antenna array 605 and the second antenna array 610. As discussed herein, in some examples, the first network node can transmit or otherwise provide the indication of the linear offset (for example, the actual linear offset or the first phase or both) before measuring and estimating for rotational offset(s) between the first antenna array 605 and the second antenna array 610. In other examples, the indication of the linear offset may be provided with the indication of the rotational offset(s). Antenna array configuration 600 provides an example in which the indication of the linear offset has been provided to the second device, which has adjusted the metric(s) to compensate for the linear offset prior to transmitting reference signals used for measuring and estimating the rotational offset(s).

As previously discussed, an orientation between the first antenna array 605 and the second antenna array 610 can be misaligned along the linear access (for example, along the z access corresponding to the linear offset) in addition to, or in lieu of, along one or more rotational offsets (e.g., rotational angle offsets). The rotational offsets can correspond to the first antenna array 605 being rotated about the z axis such that the antenna element pairs are not aligned. For example, an antenna 615-A of the second antenna array 610 can be misaligned with respect to a corresponding antenna element 620-A of the first antenna array 605. Similarly, antenna element 615-B may be misaligned with reference to antenna element 620-B, antenna element 615-C may be misaligned with reference to antenna element 620-C, and antenna element 615-D may be misaligned with reference to antenna element 620-D. Such misalignment can also be based on the planar face of the first antenna array 605 being non-coplanar with respect to the planar face of the second antenna array

610. That is, the first antenna array 605 may be positioned in a manner inconsistent with the antenna array placement 625.

In some cases, a network node can determine the rotational offsets in terms of rotational angle offsets (for example, rotational angles along one or more axes at the first antenna array 605 relative to the second antenna array 610). As described herein, various types of coordinate systems can be used to estimate the offsets, including the rotational offsets. Rotational offsets can be represented as an angle (for example, in degrees) or in another type of rotational measurement representation. In some cases, the second network node transmits a second plurality of reference signals to a first plurality of antennas of the first antenna array 605 and from a second plurality of antennas of the second antenna array 610. For example, a reference signal can be transmitted from antenna element 615-A to antenna element 620-A, another reference signal may be transmitted from antenna element 615-B to antenna element 620-B, another reference signal may be transmitted from antenna element 615-C to antenna element 620-C, and another reference signal may be transmitted from antenna element 615-D to antenna elements 620-D. Accordingly, the first plurality of antennas in this example can be located at noncentral locations of the first antenna array 605, such as along the peripheral edge of each antenna array.

The first network node can receive the second plurality of reference signals and measure a corresponding second plurality of phases corresponding to the second plurality of reference signals. That is, the first network node can measure the phase of the reference signal transmitted from antenna element 615-A to antenna element 620-A, and so forth. Based on the second plurality of phases, the first device may estimate the rotational offset(s) (e.g., angle(s)) between the first antenna array 605 and the second antenna array 610. In some aspects, estimating the rotational offset(s) may be based on adjusting for the linear offset. That is, the second device can apply the adjustments to the metric(s) if transmitting the second set of reference signals in order to eliminate or otherwise pre-compensate for the linear offset misalignment.

Accordingly, with the origin of the receive plain coordinate on the transmitting plane Z axis adjusted for, only the rotational offsets RLF to be determined. This may be illustrated as according to Equation (39) below:

$$\begin{bmatrix} x \\ y \\ z \end{bmatrix} = \begin{bmatrix} 0 \\ 0 \\ z_0 \end{bmatrix} + \begin{bmatrix} \cos\alpha\cos\beta & \cos\alpha\sin\beta\sin\gamma - \sin\alpha\cos\gamma & \cos\alpha\sin\beta\cos\gamma + \sin\alpha\sin\gamma \\ \sin\alpha\cos\beta & \sin\alpha\sin\beta\sin\gamma + \cos\alpha\cos\gamma & \sin\alpha\sin\beta\cos\gamma - \cos\alpha\sin\gamma \\ -\sin\beta & \cos\beta\sin\gamma & \cos\beta\cos\gamma \end{bmatrix} \begin{bmatrix} x' \\ y' \\ z' \end{bmatrix}. \tag{39}$$

An intuitive approach to this can be, if $\beta=0$ and $\gamma=0$, the following four distances can be considered equal: distance [reception plane $$(d'_x, 0, 0)$$

and transmission plane $(d_x, 0, 0)$], distance [reception plane $$(-d'_x, 0, 0)$$

and transmission plane $(-d_x, 0, 0)$], distance [reception plane $$(0, d'_y, 0)$$

and transmission plane $(0, d_y, 0)$], and distance $$[\text{reception plane } (0, -d'_y, 0)]$$

and transmission plane $(0, -d_y, 0)$].

Rotational offset compensation if symmetric transmission plane and reception plane channel reciprocity can be based on the correlation between the antenna elements of the antenna arrays. For example, if there are the same number of transmission plane and receive plane units (for example, antenna elements), and each unit in the transmission plane $(x, y, 0)$ is paired with a corresponding reception plane unit $(x', y', z')$, then the following can be calculated: the distance between $(x, y, z)$ and $(x', y', z')$—the distance between $(0,0,0)$ (transmission plane) and $(0,0,0)$ (reception plane). The distance/phase difference can be fed back by the first device; or if channel reciprocity is assumed, this can be estimated directly by the second device by transmissions from the first device. However, other scenarios may not have either symmetry or reciprocity.

In this situation, the distance [reception plane $$[\text{reception plane } (d'_x, 0, 0)]$$

and transmission plane $$(d_x, 0, 0)] = \sqrt{(\cos\alpha\cos\beta d'_x - d_x)^2 + (\sin\alpha\cos\beta d'_x)^2 + (\sin\beta d'_x)^2 - 2\sin\beta d'_x z_0 + z_0^2} \approx$$
$$z_0 + \frac{(\cos\alpha\cos\beta d'_x - d_x)^2 + (\sin\alpha\cos\beta d'_x)^2 + (\sin\beta d'_x)^2 - 2\sin\beta d'_x z_0}{2z_0}$$

and the distance [reception plane $(-d'_x, 0, 0)$ and transmission plane $$(-d_x, 0, 0)] = \sqrt{(-\cos\alpha\,\cos\beta d_x' + d_x)^2 + (-\sin\alpha\,\cos\beta d_x')^2 + (\sin\beta d_x' + z_0)^2} \approx$$

$$z_0 + \frac{(\cos\alpha\,\cos\beta d_x' - d_x)^2 + (\sin\alpha\,\cos\beta d_x')^2 + (\sin\beta d_x')^2 + 2\,\sin\beta d_x' z_0}{2z_0},$$

the distance [reception plane $$(0, d_y', 0)$$

and transmission plane $$(0, d_y, 0)] = \sqrt{\left[(\cos\alpha\,\sin\beta\sin\gamma - \sin\alpha\cos\gamma)d_y'\right]^2 + \left[(\sin\alpha\,\sin\beta\sin\gamma + \cos\alpha\cos\gamma)d_y' - d_y\right]^2 + \left(\cos\beta\sin\gamma d_y' + z_0\right)^2} \approx$$

$$z_0 + \frac{\left[(\cos\alpha\,\sin\beta\sin\gamma - \sin\alpha\cos\gamma)d_y'\right]^2 + \left[(\sin\alpha\,\sin\beta\sin\gamma + \cos\alpha\cos\gamma)d_y' - d_y\right]^2 + \left(\cos\beta\sin\gamma d_y'\right)^2 + 2\,\cos\beta\sin\gamma d_y' z_0}{2z_0},$$

and the distance [reception plane $$\left(0, -d_y', 0\right)$$

and transmission plane $$(0, -d_y, 0)] = \sqrt{\left[-(\cos\alpha\,\sin\beta\sin\gamma - \sin\alpha\cos\gamma)d_y'\right]^2 + \left[-(\sin\alpha\,\sin\beta\sin\gamma + \cos\alpha\cos\gamma)d_y' + d_y\right]^2 + \left(-\cos\beta\sin\gamma d_y' + z_0\right)^2} \approx$$

$$z_0 + \frac{\left[(\cos\alpha\,\sin\beta\sin\gamma - \sin\alpha\cos\gamma)d_y'\right]^2 + \left[(\sin\alpha\,\sin\beta\sin\gamma + \cos\alpha\cos\gamma)d_y' - d_y\right]^2 + \left(\cos\beta\sin\gamma d_y'\right)^2 - 2\,\cos\beta\sin\gamma d_y' z_0}{2z_0}.$$

Additionally, further steps can include {distance [reception plane $(d'_x, 0,0)$ and transmission plane $(d_x, 0,0)$]–distance

[reception plane $(-d_x', 0, 0)$ and transmission plane $$(-d_x, 0, 0)]\} \approx \frac{-2\,\sin\beta d_x' z_0}{z_0} \approx 2d_x'\sin\beta \propto \sin\beta,$$

the {distance

[reception plane $\left(0, d_y', 0\right)$ and transmission plane $(0, d_y, 0)$]–distance [reception plane $$(-d_x, 0, 0)]\} \approx \frac{2\,\cos\beta\sin\gamma d_y' z_0}{z_0} \approx 2d_y'\cos\beta\sin\gamma \propto \cos\beta\sin\gamma.$$

The asymmetry between $\beta$ and $\gamma$ may come from the 3D rotation matrix in which $(\alpha, \beta, \gamma)$ with respect to the z-, y-, and x-axes of the transmission plane coordinates, in that order. Accordingly, $\beta$, $\gamma$ can be solved; then $\alpha$ can be solved by any one or a multiple of the four distances above. Again, reference signals (for example, the second plurality of reference signals) used for the transmission plane units (for example, the antenna elements 615 of the second antenna array 610) may be used for phase measurements, wherein the units are at the four corners or peripheral edges of the transmission plane or both.

Accordingly, the first network node can measure the second plurality of phases and transmit or otherwise convey an indication of the rotational offset(s) (for example, the rotational offset(s) or the second plurality of phases or both) to the second network node. The second network node can adjust or otherwise modify metric(s) used for communications between the first antenna array 605 and the second antenna array 610, based on the indication.

In some cases, modifying metrics can be performed according to Equation (40) below:

$$\begin{bmatrix} x'' \\ y'' \\ z'' \end{bmatrix} = \begin{bmatrix} \cos\alpha\,\cos\beta & \cos\alpha\,\sin\beta\sin\gamma - \sin\alpha\cos\gamma & \cos\alpha\,\sin\beta\cos\gamma + \sin\alpha\sin\gamma \\ \sin\alpha\,\cos\beta & \sin\alpha\,\sin\beta\sin\gamma + \cos\alpha\cos\gamma & \sin\alpha\,\sin\beta\cos\gamma - \cos\alpha\sin\gamma \\ -\sin\beta & \cos\beta\sin\gamma & \cos\beta\cos\gamma \end{bmatrix} \begin{bmatrix} x' \\ y' \\ z' \end{bmatrix}. \qquad (40)$$

US 12,689,415 B2

35

For each transmitter at (x,y,0) in the transmission plane: modifying the metric can include finding the corresponding (x",y",z") at the rotated transmission plane according to the formula, in which the matrix inverse can be found in closed form by reversing the rotation angles. The propagation path length can be found using:

$$\text{sign}(z'')\sqrt{(x-x'')^2 + (y-y'')^2 + z''^2}.$$

Pre-compensating a phase can be equal to $$-\frac{2\pi}{\lambda}\text{sign}(z'')\sqrt{(x-x'')^2 + (y-y'')^2 + z''^2}.$$

As indicated above, FIGS. 6A and 6B are provided as examples. Other examples may differ from what is described with regard to FIGS. 6A and 6B. For example, two misaligned network nodes with different angles with respect to the z axis can be served with MU-MIMO in a similar manner as that serving MU-MIMO to one aligned network node and one misaligned network node.

Figures 7A, 7B:
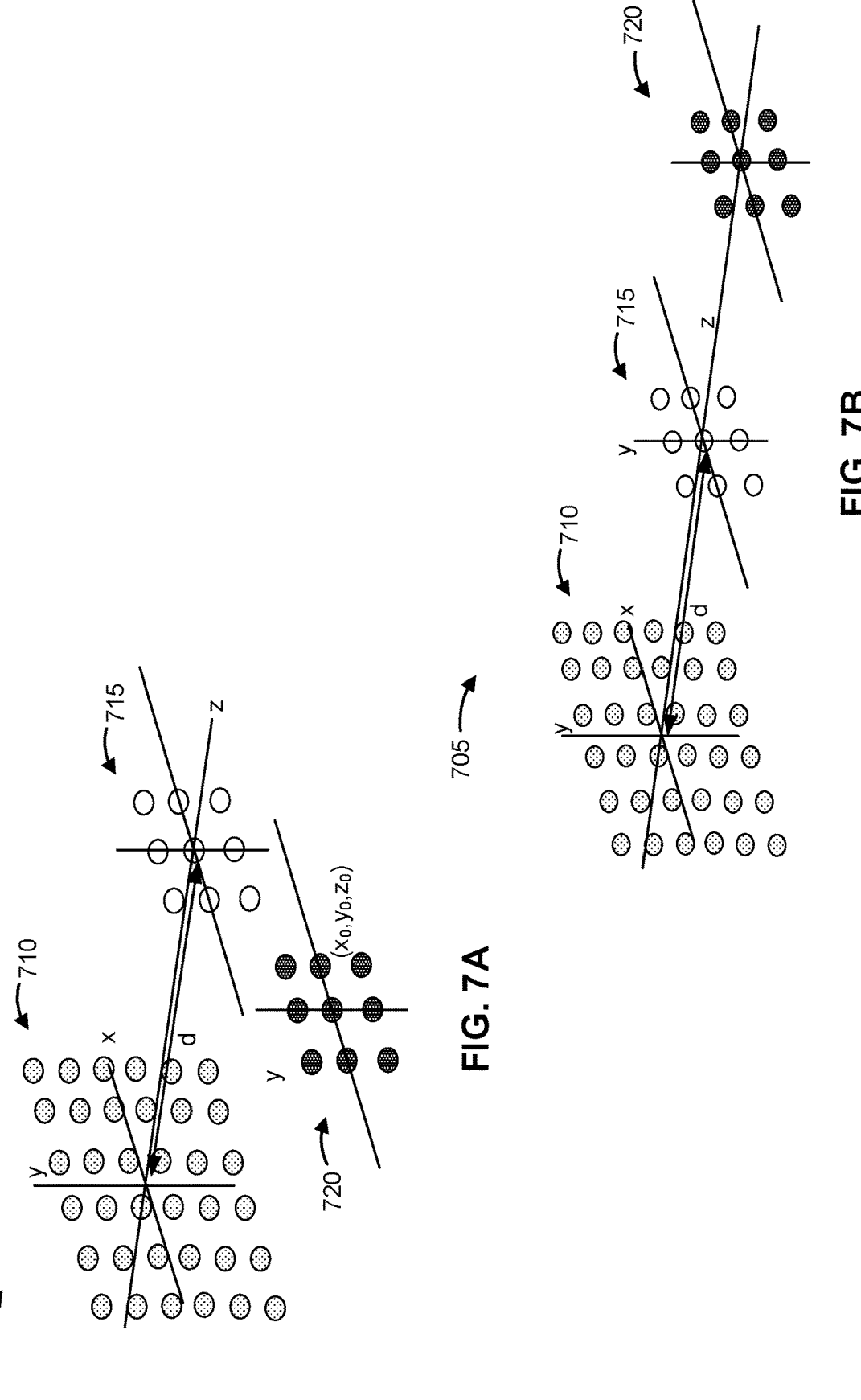
FIGS. 7A and 7B illustrate examples of multi-user communication in accordance with the present disclosure.

FIGS. 7A and 7B illustrate examples 700 and 705 of multi-user communication in accordance with the present disclosure. As shown in example 700, a first network node 710 (represented by an illustrative antenna array) communicates with a second network node 715 (represented by an illustrative antenna array) and a third network node 720 (represented by an illustrative antenna array). The network node 715 is aligned with the network node 710 with respect to a z axis. In example 700, the network node 720 is out of alignment with the network node 710 with respect to the z axis. In example 705, both network nodes 715 and 720 are aligned with the network node 710 with respect to the z axis but are located at different distances from the network node 720.

The network nodes 710, 715, and 720 can be configured to communicate using LOS MIMO techniques such as those described above. For example, LOS MIMO can be used in industrial environments, wireless communication among servers in a server farm, and/or other environments conducive to LOS communication, such as, for example, networks having wireless backhauls. In such environments, the respective antenna arrays of the two network nodes can be installed such that they are aligned along a first axis (for example, a horizontal axis or a vertical axis) as well as rotationally (for example, such that respective antenna elements of an antenna array of one network node are aligned with respective antenna elements of an antenna array of the other network node in various rotational axes).

In some cases, it can be beneficial for a network node (e.g., the network node 710) to be able to communicate simultaneously with more than one other network node (e.g., network nodes 715 and 720). Simultaneous communication refers to two or more communications that share at least one communication resource. The shared communication resource can include a time resource and/or a frequency resource. While the phase compensation and LOS codebook techniques described above can provide solutions for supporting LOS MIMO in cases in which the network nodes are aligned, the techniques do not address a MU MIMO case. As a result, attempts by a network node to engage in simultaneous communication can result in failed transmissions, missed communications, and/or other negative impacts on network performance.

Some aspects of the techniques and apparatuses described herein provide for MU MIMO for LOS MIMO with a rectangular antenna array. In some aspects, for example, a first network node having a rectangular antenna array may communicate with a second network node using an LOS MIMO configuration at a frequency, and may communicate, based at least in part on an MU MIMO mode, with a third network node using the LOS MIMO configuration and at the frequency. The MU MIMO mode may correspond to an antenna system configuration of the rectangular antenna array. The antenna system configuration may include at least one of an antenna assignment scheme, an antenna amplitude configuration, or an antenna phase configuration. In some aspects, the MU MIMO mode may correspond to one more transmission parameters such as, for example, a transmission power, a frequency, and/or a periodicity, among other examples. In this way, some aspects may facilitate MU MIMO communications in LOS MIMO scenarios, allowing network nodes to communicate with more than one additional network node simultaneously. As a result, some aspects may facilitate reducing failed transmissions and missed communications, and/or other positive impacts on network performance.

As indicated above, FIG. 7 is provided as an example. Other examples may differ from what is described with regard to FIG. 7.

Figure 8:
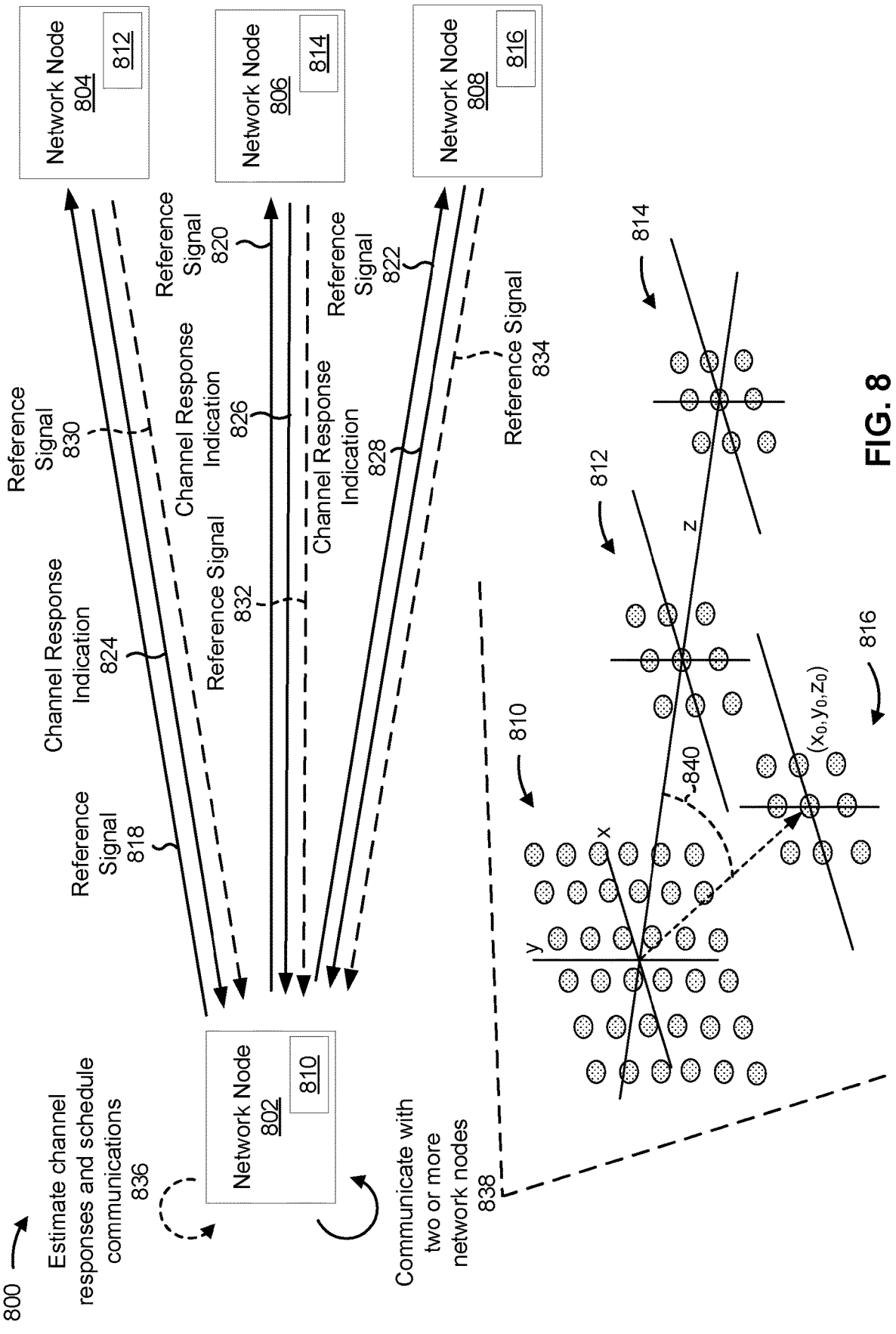
FIGS. 8 and 9 are diagrams illustrating examples associated with multi-user (MU) MIMO for LOS MIMO with a rectangular array, in accordance with the present disclosure.

FIG. 8 is a diagram illustrating an example 800 associated with MU MIMO for LOS MIMO with a rectangular array, in accordance with the present disclosure. As shown, a network node 802 may communicate with a network node 804, a network node 806, and a network node 808. In some aspects, the network node 802 may communicate only with two of the network nodes 804, 806, and 808. In some other aspects, the network node 802 may communicate with any number of additional network nodes (not illustrated). In some aspects, the network node 802 may be referred to as a "first network node," the network node 804 may be referred to as a "second network node," the network node 806 may be referred to as a "third network node," and the network node 808 may be referred to as a "fourth network node." In some other aspects, any of the network nodes 804, 806, and 808 may be referred to as a "first network node."

As is also shown in FIG. 8, the network node 802 may include a rectangular antenna array 810. In some aspects, the network node 804 may include a rectangular antenna array 812. In some aspects, the network node 806 may include a rectangular antenna array 814. In some aspects, the network node 808 may include a rectangular antenna array 816. In some other aspects, one or more of the network nodes 804, 806, and 808 may include an antenna array that is a non-rectangular antenna array (e.g., a circular antenna array). In some aspects, the network node 802 may be referred to as a "transmission network node," in which case the network nodes 804, 806, and 808 may be referred to as "reception network nodes." In some other aspects, the network node 802 may be referred to as a "reception network node," in which case the other network nodes 804, 806, and 808 may be referred to as "transmission network nodes."

In aspects in which the network node 802 is a transmission network node, the network node 802 may provide reference signals to the reception network nodes 804, 806, and 808 for channel estimation. For example, as shown by reference number 818, the network node 802 transmits, and the network node 804 receives, a reference signal. As shown by reference number 820, the network node 802 transmits, and the network node 806 receives, a reference signal.

Similarly, as shown by reference number 822, the network node 802 transmit, and the network node 808 receives, a reference signal.

The network nodes 804, 806, and 808 may determine one or more channel response parameters based at least in part on the respective reference signals. The one or more channel response parameters may include, for example, an estimated channel response, an RSRP, an RSRQ, and/or an interference measurement, among other examples. As shown by reference number 824, the network node 804 may transmit, and the network node 802 may receive, a channel response indication. The channel response indication may indicate the one or more channel response parameters determined by the network node 804. Similarly, as shown by reference number 826, the network node 806 may transmit, and the network node 802 may receive, a channel response indication. As shown by reference number 828, the network node 808 may transmit, and the network node 802 may receive, a channel response indication. In some aspects, one or more of the channel response indications may include a channel matrix and/or a channel gain measurement associated with at least one pair of antennas or a pair of MU MIMO modes.

As indicated above, in some aspects, the network node 802 may be a receiving network node. In this case, as shown by reference number 830, the network node 804 may transmit, and the network node 802 may receive, a reference signal. Similarly, as shown by reference number 832, the network node 806 may transmit, and the network node 802 may receive, a reference signal. As shown by reference number 834, the network node 808 may transmit, and the network node 802 may receive, a reference signal. In this case, as shown by reference number 836, the network node 802 may estimate channel responses for each channel corresponding to each reference signal and may schedule communications based at least in part on those estimated channel responses. In some aspects, for example, the network node 802 may estimate inter-node interference and select transmission modes and/or other parameters so as to minimize the inter-node interference (and/or an impact thereof) during simultaneous communications with the network nodes 804, 808, and/or 808.

As shown by reference number 838, the network node 802 may communicate with two or more of the network nodes 804, 808, and 808. The term "communicate" may refer to transmitting signals and/or receiving signals. In some aspects, the network node 802 may communicate with a network node (e.g., the network node 804) using an LOS MIMO configuration at a frequency. The network node 802 may communicate, based at least in part on an MU MIMO mode, with a network node (e.g., network node 806) using the LOS MIMO configuration and at the frequency. In some aspects, the MU MIMO mode may include a phase pre-compensation. The phase pre-compensation may be applied to transmission antennas in situations in which the network node 802 is a transmission network node or to reception antennas in situations in which the network node 802 is a reception network node.

In some aspects, the network node 802 may communicate with an unaligned network node (e.g., network node 806 or network node 808) in addition to the network node 804, based at least in part on an angular separation 840 between the network node 804 and the network node 806 satisfying an angular separation threshold. For example, the LOS MIMO configuration used by the network node 802 may be based at least in part on the angular separation 840. In some aspects, a phase pre-compensation may be used, in addition to LOS MIMO codewords, to facilitate communicating with the unaligned network node. The phase pre-compensation effectively provides separate propagation angles different from the perpendicular axis. In some aspects, the angular separation 840 between the two network nodes may limit the highest angular mode that the network node 802 can use. In some aspects, if the angular separation 840 fails to satisfy the angular separation threshold, the network node 802 may communicate only with the aligned network node. In some aspects, the angular separation threshold may be based at least in part on the LOS MIMO codewords to be used, the transmit power, and/or environmental conditions, among other examples.

In some aspects, the phase pre-compensation may be determined based at least in part on one or more of the compensation techniques described in connection with FIGS. 5, 6A, and 6B. For example, as shown, the network node 802 may determine that the network node 808 is offset from the perpendicular axis (the z axis) and may add a phase compensation to accommodate the offset. In some aspects, for example, the network node 802 may apply, for any transmission antenna at (x,y), a phase pre-compensation (in addition to using LOS MIMO codewords appropriate for compensating for an axis offset). The phase pre-compensation, which effectively steers a transmission beam toward the origin of a receiving network node, may be given by, for example:

$$-\frac{\pi\left(-2xx_0 + x^2 - 2yy_0 + y^2\right)}{\lambda z_0}.$$

In some aspects, the network node 802 may determine that the network node 808 is rotationally offset from alignment with the network node 802. In that case, the network node 802 may, for each transmission antenna at (x,y,0) in the transmission plane, find the corresponding (x",y",z") at the rotated transmission plane. The matrix inverse may be found in closed form by reversing the rotation angles. The network node 802 may find the propagation path length based at least in part on $\mathrm{sign}(z")\sqrt{(x-x")^2+(y-y")^2+z"^2}$. The network node 802 may add a phase pre-compensation equal to $$-\frac{2\pi}{\lambda}\mathrm{sign}(z")\sqrt{(x - x")^2 + (y - y")^2 + z"^2}.$$

In some aspects, the MU MIMO mode corresponds to an antenna system configuration of the rectangular antenna array 810. The antenna system configuration may include an antenna assignment scheme, an antenna amplitude configuration, and/or an antenna phase configuration. For example, in some aspects, an antenna assignment scheme may define the antennas of the antenna array 810 that are active during a specified time period, for a specified communication, in a specified situation, and/or in accordance with a specified configuration, among other examples. The antenna amplitude configuration may refer to a configuration, associated with one or more antennas or groups of antennas of the antenna array 810, of amplitude levels, adjustment parameters, ranges, and/or conditions, among other examples. The antenna phase configuration may refer to a configuration, associated with one or more antennas or groups of antennas of the antenna array 810, of phase shifting levels (e.g., amounts of phase shift), adjustment parameters, ranges, and/or conditions, among other examples.

In some aspects, for example, as illustrated in FIG. 8, the antenna assignment scheme may include a superposition scheme. In a superposition scheme, a set of antennas of the antenna array 810 of the network node 802 is used to communicate with two of more of the network nodes 804, 806, and 808 simultaneously (as illustrated by each of the antenna nodes of the antenna array 810 having the same shading as each of the antenna nodes of each of the antenna arrays 812, 814, and 816).

In some aspects, the network node 802 may communicate using the superposition scheme by transmitting, using each antenna of a set of transmission antennas, signals to two or more of the network nodes 804, 806, and 808, on the same frequency. The network node 802 may apply a respective beamforming vector and/or phase pre-compensation. In some aspects, the multiple signals are not strictly orthogonal but the phase pre-compensation adjustment provides separation in physical propagation to facilitate MU MIMO. In some aspects, the rectangular antenna array 810 includes a transmission antenna array, and communicating with two or more of the network nodes 804, 806, and 808 includes modulating, based at least in part on the superposition scheme, at least one transmission amplitude corresponding to at least one antenna of the rectangular antenna array.

As indicated above, FIG. 8 is provided as an example. Other examples may differ from what is described with regard to FIG. 8.

Figure 9:
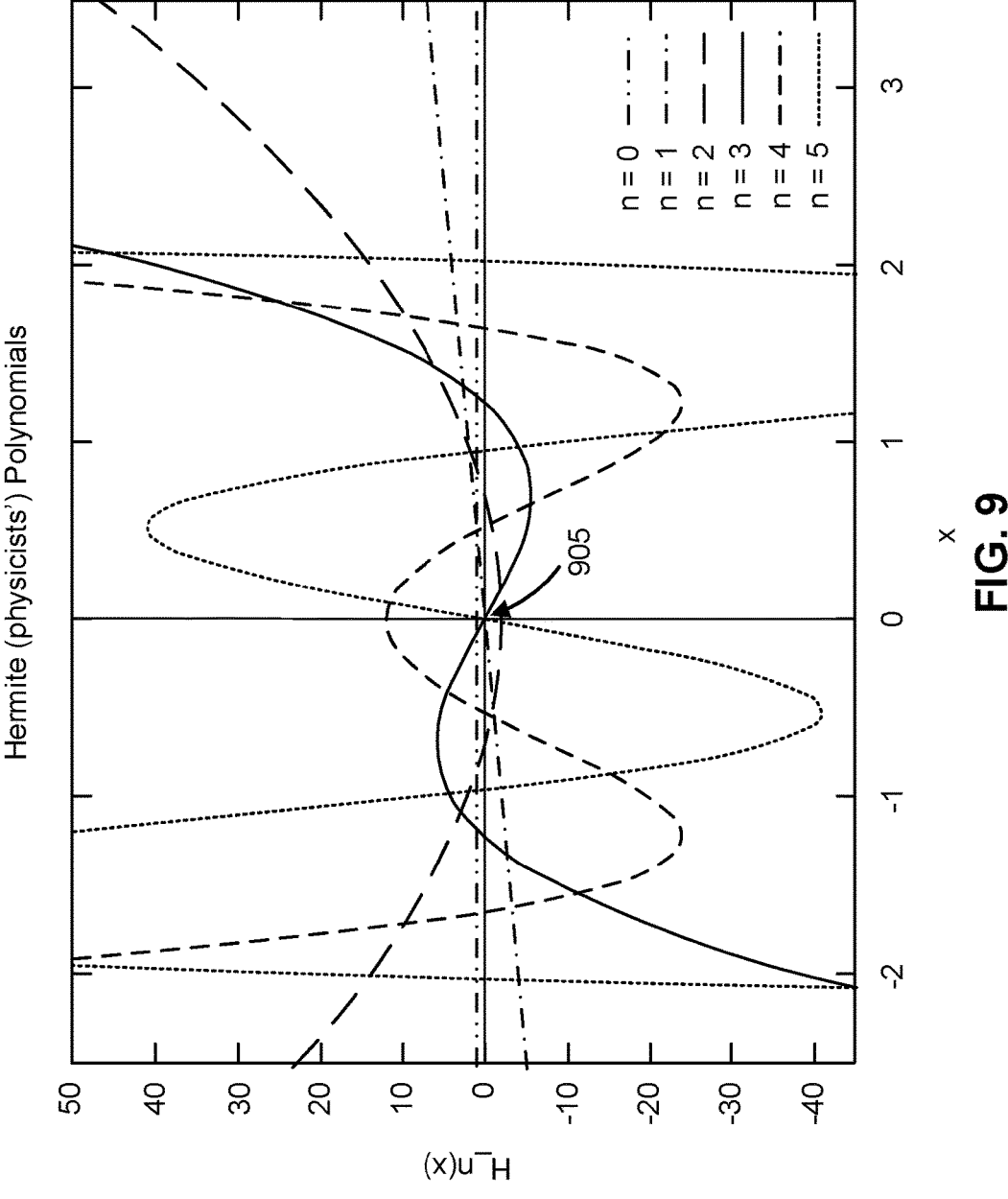

FIG. 9 is a diagram illustrating an example 900 associated with MU MIMO for LOS MIMO with a rectangular array, in accordance with the present disclosure. Example 900 depicts channel responses, H_n(x), for different LOS MIMO modes, n, in connection with samples, x, of Hermite-Guassian polynomials. In some aspects, the channel responses illustrated in FIG. 9 may correspond to signals transmitted by a first network node (e.g., network node 802, depicted in FIG. 8). For example, in some aspects, the network node may communicate with a second network node (e.g., network node 804, depicted in FIG. 8) using at least one even LOS MIMO mode (e.g., where n=2, 4, 6, . . . ) and may communicate with a third network node (e.g., network node 806, depicted in FIG. 8) using at least one odd LOS MIMO mode (e.g., where n=1, 3, 5, . . . ). Even modes are modes associated with symmetric vectors and odd modes are modes associated with anti-symmetric vectors. For example, the channel response may be a function of the composite variable of $$\frac{x^2}{\lambda z} \text{ and } \frac{y^2}{\lambda z}.$$

As shown in FIG. 9, even modes tend to have a large signal energy around the origin 905 while odd modes have a null in the origin 905. Additionally, as shown, higher modes (e.g., modes indicated by a larger value of n) tend to result in energy farther away from the origin 905. Thus, using even modes and odd modes (and lower and higher modes), respectively, signals may be separately transmitted to, or received from, different network nodes.

As indicated above, FIG. 9 is provided as an example. Other examples may differ from what is described with regard to FIG. 9.

Figures 10A, 10B:
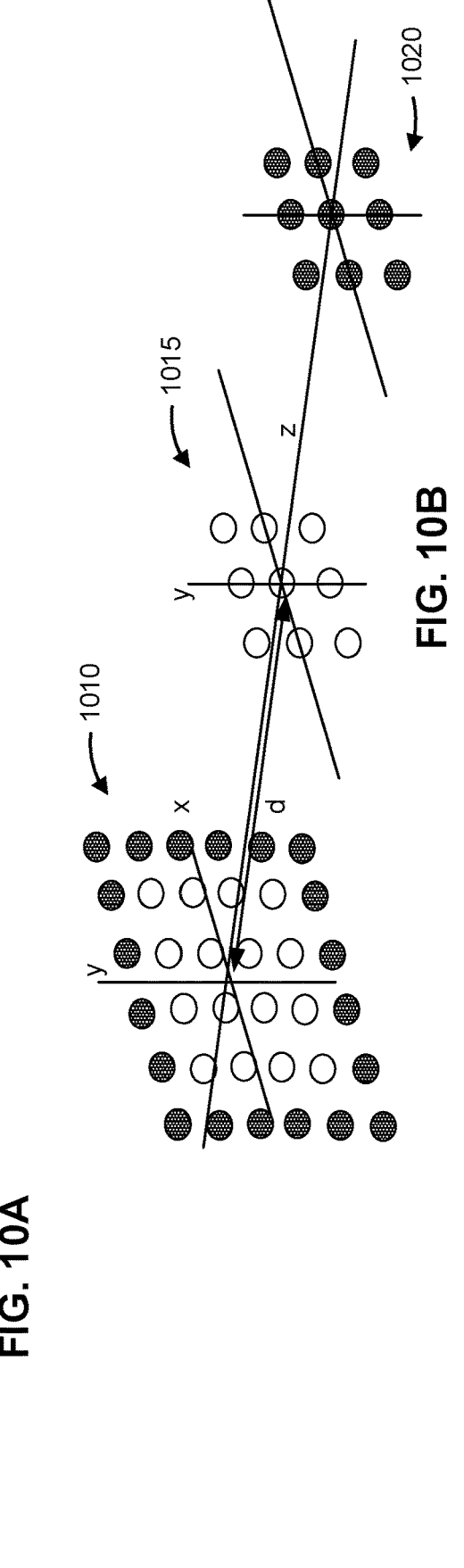
FIGS. 10A and 10B are diagrams illustrating examples associated with MU MIMO for LOS MIMO with a rectangular array, in accordance with the present disclosure.

FIGS. 10A and 10B are diagrams illustrating examples 1000 and 1005 associated with MU MIMO for LOS MIMO with a rectangular array, in accordance with the present disclosure. As indicated above, the MU MIMO mode may correspond to an antenna system configuration of a rectangular antenna array of a first network node. As shown in FIGS. 10A and 10B, a first rectangular antenna array 1010 may be in alignment with a second antenna array 1015 with respect to a z axis that is perpendicular to the face of the first rectangular antenna array 1010. The first rectangular antenna array 1010 may correspond to a first network node (e.g., the first network node 802 depicted in FIG. 8). The second antenna array 1015 may correspond to a second network node (e.g., the second network node 804, depicted in FIG. 8). A third antenna array 1020 may correspond to a third network node (e.g., the third network node 806, depicted in FIG. 8).

In the example 1000 shown in FIG. 10A, the third antenna array 1020 may be out of alignment with the first antenna array 1010 with respect to the z axis. In example 1000, the antenna assignment scheme may include a block-wise scheme. In a block-wise scheme, blocks of mutually-adjacent antennas may be determined and used, independently of one another, to communicate with respective antenna arrays 1015 and 1020. For example, in some aspects, the first network node (e.g., using the first antenna array 1010) may communicate with the second network node (e.g., using the second antenna array 1015) using a first block of mutually-adjacent antennas (shown as unshaded antennas). In some aspects, the first network node may communicate with the third network node using a second block of mutually-adjacent antennas (shown as shaded antennas). In some aspects, the network node may communicate with the second network node using a first array gain and a first beam width, and the network node may communicate with the third network node using at least one of a second array gain or a second beam width. in some aspects, the network node may apply a phase pre-compensation to one or more antennas in a block of mutually-adjacent antennas.

In the example 1005 shown in FIG. 10B, the third antenna array 1020 is in alignment with the first antenna array with respect to the z axis. In example 1005, the antenna assignment scheme may include a nesting scheme. In a nesting scheme, the first network node may communicate (using the first antenna array 1010) with the second network node (corresponding to antenna array 1015) using an inner set of antennas (shown as unshaded antennas). The first network node may communicate (e.g., using the first antenna array 1010) with the third network node (e.g., corresponding to antenna array 1020 using an outer set of antennas (shown as shaded antennas).

In some aspects, the first network node uses the outer set of antennas to communicate with the network node that is further away from the first network node (in this case, the third network node). For example, as described above in connection with FIG. 8, the channel response may be a function of the composite variable of $$\frac{x^2}{\lambda z} \text{ and } \frac{y^2}{\lambda z}$$

and, therefore, for networks farther away (with a larger z), the transmission and reception nodes can be physically farther from the origin. In some aspects, even modes may be used with the inner set of antennas and odd modes may be used with the outer set of antennas.

As indicated above, FIG. 10 is provided as an example. Other examples may differ from what is described with regard to FIG. 10.

Figure 11:
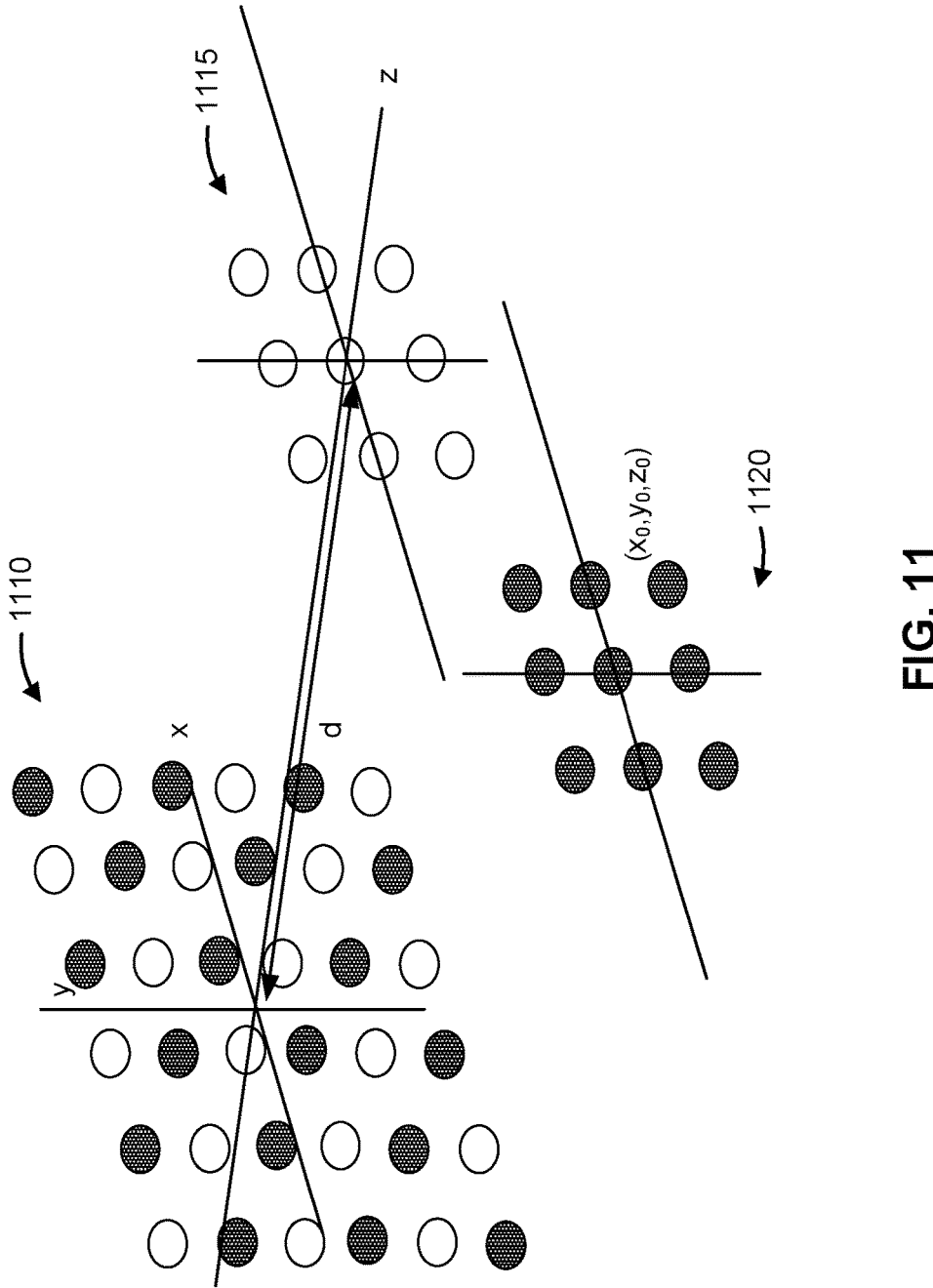
FIG. 11 is a diagram illustrating an example associated with MU MIMO for LOS MIMO with a rectangular array, in accordance with the present disclosure

FIG. 11 is a diagram illustrating an example 1100 associated with MU MIMO for LOS MIMO with a rectangular array, in accordance with the present disclosure. As indicated above, the MU MIMO mode may correspond to an antenna system configuration of a rectangular antenna array of a first network node. As shown in FIG. 11, a first rectangular antenna array 1110 may be in alignment with a second antenna array 1115 with respect to a z axis that is perpendicular to the face of the first rectangular antenna array 1110. The first rectangular antenna array 1110 may correspond to a first network node (e.g., the first network node 802 depicted in FIG. 8). The second antenna array 1115 may correspond to a second network node (e.g., the second network node 804, depicted in FIG. 8). A third antenna array 1120 may correspond to a third network node (e.g., the third network node 806, depicted in FIG. 8).

In the example 1100 shown in FIG. 11, the third antenna array 1120 may be out of alignment with the first antenna array 1110 with respect to the z axis. In example 1100, the antenna assignment scheme may include an interlacing scheme. In an interlacing scheme, as shown, antennas assigned to communicate with the second antenna array 1115 may be interlaced with antennas assigned to communicate with the third antenna array 1120. In an interlacing scheme, array gain may be reduced and a beam width may be narrower than in the case of other antenna assignment schemes. In some aspects, the first network node may modulate array gain and beam width such that different antennas are used with different array gains and beam widths.

As indicated above, FIG. 11 is provided as an example. Other examples may differ from what is described with regard to FIG. 11.

FIG. 12 is a diagram illustrating an example process 1200 performed, for example, by a first network node, in accordance with the present disclosure. Example process 1200 is an example where the first network node (e.g., first network node 802) performs operations associated with MU MIMO for LOS MIMO with a rectangular antenna array.

As shown in FIG. 12, in some aspects, process 1200 may include communicating with a second network node using an LOS MIMO configuration at a frequency (block 1210). For example, the first network node (e.g., using communication manager 1208, reception component 1202, and/or transmission component 1304, depicted in FIG. 13) may communicate with a second network node using an LOS MIMO configuration at a frequency, as described above.

As further shown in FIG. 12, in some aspects, process 1200 may include communicating, based at least in part on an MU MIMO mode, with a third network node using the LOS MIMO configuration and at the frequency, wherein the MU MIMO mode corresponds to an antenna system configuration of the rectangular antenna array, wherein the antenna system configuration includes at least one of an antenna assignment scheme, an antenna amplitude configuration, or an antenna phase configuration (block 1220). For example, the first network node (e.g., using communication manager 1308, reception component 1302, and/or transmission component 1304, depicted in FIG. 13) may communicate, based at least in part on an MU MIMO mode, with a third network node using the LOS MIMO configuration and at the frequency, wherein the MU MIMO mode corresponds to an antenna system configuration of the rectangular antenna array, as described above.

Process 1200 may include additional aspects, such as any single aspect or any combination of aspects described below and/or in connection with one or more other processes described elsewhere herein.

In a first aspect, the second network node is aligned with an LOS communication axis associated with the first network node.

In a second aspect, alone or in combination with the first aspect, the third network node is not aligned with the LOS communication axis associated with the first network node.

In a third aspect, alone or in combination with the second aspect, communicating with the third network node comprises communicating with the third network node based at least in part on an angular separation between the second network node and the third network node satisfying an angular separation threshold.

In a fourth aspect, alone or in combination with one or more of the second or third aspects, the LOS MIMO configuration is based at least in part on an angular separation between the second network node and the third network node.

In a fifth aspect, alone or in combination with one or more of the first through fourth aspects, the antenna assignment scheme comprises a superposition scheme, wherein communicating with the second network node comprises communicating with the second network node using a set of antennas of the rectangular antenna array, and communicating with the third network node comprises communicating, based at least in part on the superposition scheme, with the third network node using the set of antennas of the rectangular antenna array simultaneously with communicating with the second network node.

In a sixth aspect, alone or in combination with the fifth aspect, the rectangular antenna array comprises a transmission antenna array, and communicating with the third network node comprises modulating, based at least in part on the superposition scheme, at least one transmission amplitude corresponding to at least one antenna of the rectangular antenna array.

In a seventh aspect, alone or in combination with one or more of the fifth or sixth aspects, communicating with the second network node comprises communicating using at least one even LOS MIMO mode, and communicating with the third network node comprises communicating using at least one odd LOS MIMO mode.

In an eighth aspect, alone or in combination with the seventh aspect, a first separation distance between the first network node and the second network node is smaller than a second separation distance between the first network node and the third network node.

In a ninth aspect, alone or in combination with one or more of the first through eighth aspects, the antenna assignment scheme comprises a block-wise scheme, wherein communicating with the second network node comprises communicating with the second network node using a first block of mutually-adjacent antennas of a set of antennas of the rectangular antenna array, and communicating with the third network node comprises communicating, based at least in part on the block-wise scheme, with the third network node using a second block of mutually-adjacent antennas of the set of antennas.

In a tenth aspect, alone or in combination with the ninth aspect, communicating with the second network node comprises communicating using a first array gain and a first beam width, and communicating with the third network node comprises communicating using at least one of a second array gain or a second beam width.

In an eleventh aspect, alone or in combination with one or more of the first through tenth aspects, the antenna assignment scheme comprises an interlacing scheme, wherein communicating with the second network node comprises communicating with the second network node using a first subset of antennas of a set of antennas of the rectangular antenna array, and communicating with the third network node comprises communicating, based at least in part on the interlacing scheme, with the third network node using a second subset of antennas of the set of antennas, wherein positions, within the rectangular antenna array, of the respective antennas of the first set of antennas and the second set of antennas are interlaced based at least in part on the interlacing scheme.

In a twelfth aspect, alone or in combination with the eleventh aspect, communicating with the second network node comprises communicating using a first array gain and a first beam width, and communicating with the third network node comprises communicating using at least one of a second array gain or a second beam width.

In a thirteenth aspect, alone or in combination with one or more of the first through twelfth aspects, the antenna assignment scheme comprises a nesting scheme, wherein communicating with the second network node comprises communicating with the second network node using an outer subset of antennas of a set of antennas of the rectangular antenna array, and communicating with the third network node comprises communicating, based at least in part on the nesting scheme, with the third network node using an inner subset of antennas of the set of antennas.

In a fourteenth aspect, alone or in combination with the thirteenth aspect, communicating with the second network node comprises communicating using at least one odd LOS MIMO mode, and communicating with the third network node comprises communicating using at least one even LOS MIMO mode.

In a fifteenth aspect, alone or in combination with the thirteenth aspect, a first separation distance between the first network node and the second network node is smaller than a second separation distance between the first network node and the third network node.

In a sixteenth aspect, alone or in combination with one or more of the first through fifteenth aspects, communicating with the third network node comprises applying at least one LOS MIMO beamforming weight, of a plurality of LOS MIMO beamforming weights in an LOS MIMO codebook, to the rectangular antenna array, and the MU MIMO mode corresponds to a set of MU MIMO beamforming weights that are not included in the LOS MIMO codebook.

In a seventeenth aspect, alone or in combination with one or more of the first through sixteenth aspects, the rectangular antenna array comprises a transmission antenna array, and process 1200 includes transmitting a first reference signal to the second network node, transmitting, using the transmission antenna array, a second reference signal to the third network node, receiving a first channel response indication from the second network node, receiving a second channel response indication from the third network node, and adjusting at least one communication parameter associated with the transmission antenna array based at least in part on at least one of the first channel response indication or the second channel response indication.

In an eighteenth aspect, alone or in combination with the seventeenth aspect, at least one of the first channel response indication or the second channel response indication comprises a channel matrix.

In a nineteenth aspect, alone or in combination with one or more of the seventeenth or eighteenth aspects, at least one of the first channel response indication or the second channel response indication comprises a channel gain measurement associated with at least one of a pair of antennas or a pair of MU MIMO modes.

In a twentieth aspect, alone or in combination with one or more of the first through nineteenth aspects, the rectangular antenna array comprises a reception antenna array, process 1200 includes receiving, using the reception antenna array, a first reference signal from the second network node, receiving, using the reception antenna array, a second reference signal from the third network node, and scheduling, based at least in part on an inter-device interference measurement, a first set of communication resources associated with the second network node and a second set of communication resources associated with the third network node, wherein the inter-device interference measurement is based at least in part on the first reference signal and the second reference signal.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
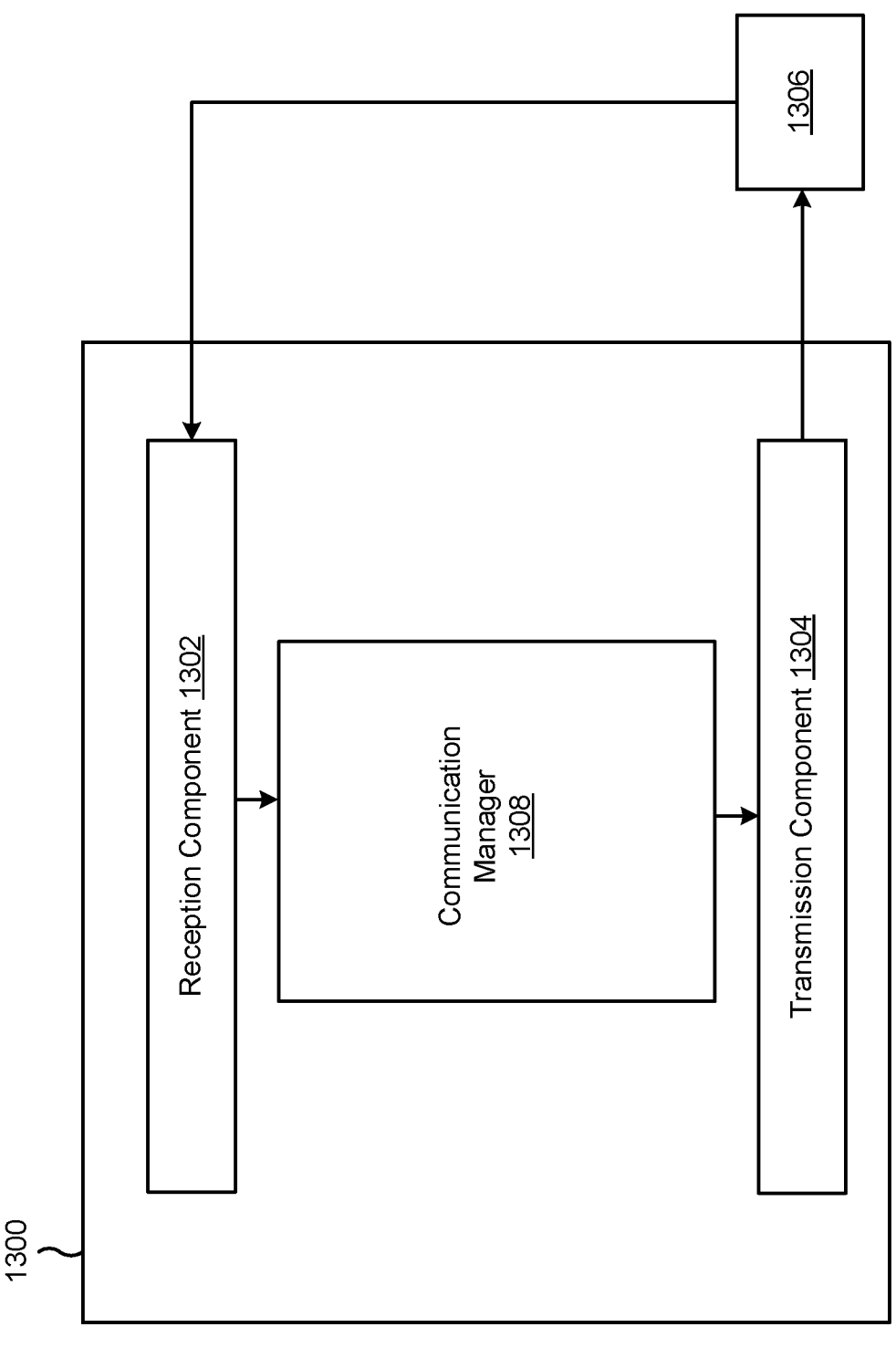
FIG. 13 is a diagram of an example apparatus for wireless communication, in accordance with the present disclosure.

FIG. 13 is a diagram of an example apparatus 1300 for wireless communication. The apparatus 1300 may be a network node, or a network node may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 1308. The communication manager 1308 may be, or be similar to, the communication manager 140 and/or the communication manager 150 depicted in FIGS. 1 and 2.

In some aspects, the apparatus 1300 may be configured to perform one or more operations described herein in connection with FIGS. 8-11. Additionally, or alternatively, the apparatus 1300 may be configured to perform one or more processes described herein, such as process 1200 of FIG. 12. In some aspects, the apparatus 1300 and/or one or more components shown in FIG. 13 may include one or more components of the UE and/or the base station described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the UE and/or the base station described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the UE and/or the base station described in connection with FIG. 2. In some aspects, the transmission component 1304 may be co-located with the reception component 1302 in a transceiver.

The communication manager 1308, the reception component 1302, and/or the transmission component 1304 may communicate with a second network node using an LOS MIMO configuration at a frequency. The communication manager 1308, the reception component 1302, and/or the transmission component 1304 may communicate, based at least in part on a multi-user MIMO (MU MIMO) mode, with a third network node using the LOS MIMO configuration and at the frequency, wherein the MU MIMO mode corresponds to an antenna assignment scheme of the rectangular antenna array. In some aspects, the communication manager 1308 may include one or more antennas, a modem, a controller/processor, a memory, or a combination thereof, of the UE and/or the base station described in connection with FIG. 2. In some aspects, the communication manager 1308 may include the reception component 1302 and/or the transmission component 1304.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a first network node having a rectangular antenna array, comprising: communicating with a sec-ond network node using a line-of-sight (LOS) multiple input multiple output (MIMO) configuration at a frequency; and communicating, based at least in part on a multi-user MIMO (MU MIMO) mode, with a third network node using the LOS MIMO configuration and at the frequency, wherein the MU MIMO mode corresponds to an antenna system configuration of the rectangular antenna array, wherein the antenna system configuration includes at least one of an antenna assignment scheme, an antenna amplitude configuration, or an antenna phase configuration.

Aspect 2: The method of Aspect 1, wherein the second network node is aligned with a LOS communication axis associated with the first network node.

Aspect 3: The method of Aspect 2, wherein the third network node is not aligned with the LOS communication axis associated with the first network node.

Aspect 4: The method of Aspect 3, wherein communicating with the third network node comprises communicating with the third network node based at least in part on an angular separation between the second network node and the third network node satisfying an angular separation threshold.

Aspect 5: The method of either of Aspects 3 or 4, wherein the LOS MIMO configuration is based at least in part on an angular separation between the second network node and the third network node.

Aspect 6: The method of any of Aspects 1-5, wherein the antenna assignment scheme comprises a superposition scheme, wherein communicating with the second network node comprises communicating with the second network node using a set of antennas of the rectangular antenna array, and wherein communicating with the third network node comprises communicating, based at least in part on the superposition scheme, with the third network node using the set of antennas of the rectangular antenna array simultaneously with communicating with the second network node.

Aspect 7: The method of Aspect 6, wherein the rectangular antenna array comprises a transmission antenna array, and wherein communicating with the third network node comprises modulating, based at least in part on the superposition scheme, at least one transmission amplitude corresponding to at least one antenna of the rectangular antenna array.

Aspect 8: The method of either of Aspects 6 or 7, wherein communicating with the second network node comprises communicating using at least one even LOS MIMO mode, and wherein communicating with the third network node comprises communicating using at least one odd LOS MIMO mode.

Aspect 9: The method of Aspect 8, wherein a first separation distance between the first network node and the second network node is smaller than a second separation distance between the first network node and the third network node.

Aspect 10: The method of any of Aspects 1-9, wherein the antenna assignment scheme comprises a block-wise scheme, wherein communicating with the second network node comprises communicating with the second network node using a first block of mutually-adjacent antennas of a set of antennas of the rectangular antenna array, and wherein communicating with the third network node comprises communicating, based at least in part on the block-wise scheme, with the third network node using a second block of mutually-adjacent antennas of the set of antennas.

Aspect 11: The method of Aspect 10, wherein communicating with the second network node comprises communicating using a first array gain and a first beam width, and wherein communicating with the third network node comprises communicating using at least one of a second array gain or a second beam width.

Aspect 12: The method of any of Aspects 1-9, wherein the antenna assignment scheme comprises an interlacing scheme, wherein communicating with the second network node comprises communicating with the second network node using a first subset of antennas of a set of antennas of the rectangular antenna array, and wherein communicating with the third network node comprises communicating, based at least in part on the interlacing scheme, with the third network node using a second subset of antennas of the set of antennas, wherein positions, within the rectangular antenna array, of the respective antennas of the first set of antennas and the second set of antennas are interlaced based at least in part on the interlacing scheme.

Aspect 13: The method of Aspect 12, wherein communicating with the second network node comprises communicating using a first array gain and a first beam width, and wherein communicating with the third network node comprises communicating using at least one of a second array gain or a second beam width.

Aspect 14: The method of any of Aspects 1-9, wherein the antenna assignment scheme comprises a nesting scheme, wherein communicating with the second network node comprises communicating with the second network node using an outer subset of antennas of a set of antennas of the rectangular antenna array, and wherein communicating with the third network node comprises communicating, based at least in part on the nesting scheme, with the third network node using an inner subset of antennas of the set of antennas.

Aspect 15: The method of Aspect 14, wherein communicating with the second network node comprises communicating using at least one odd LOS MIMO mode, and wherein communicating with the third network node comprises communicating using at least one even LOS MIMO mode.

Aspect 16: The method of Aspect 15, wherein a first separation distance between the first network node and the second network node is smaller than a second separation distance between the first network node and the third network node.

Aspect 17: The method of any of Aspects 1-16, wherein communicating with the third network node comprises applying at least one LOS MIMO beamforming weight, of a plurality of LOS MIMO beamforming weights in an LOS MIMO codebook, to the rectangular antenna array, and wherein the MU MIMO mode corresponds to a set of MU MIMO beamforming weights that are not included in the LOS MIMO codebook.

Aspect 18: The method of any of Aspects 1-17, wherein the rectangular antenna array comprises a transmission antenna array, the method further comprising: transmitting a first reference signal to the second network node; transmitting, using the transmission antenna array, a second reference signal to the third network node; receiving a first channel response indication from the second network node; receiving a second channel response indication from the third network node; and adjusting at least one communication parameter associated with the transmission antenna array based at least in part on at least one of the first channel response indication or the second channel response indication.

Aspect 19: The method of Aspect 18, wherein at least one of the first channel response indication or the second channel response indication comprises a channel matrix.

Aspect 20: The method of either of Aspects 18 or 19, wherein at least one of the first channel response indication or the second channel response indication comprises a channel gain measurement associated with at least one of a pair of antennas or a pair of MU MIMO modes.

Aspect 21: The method of any of Aspects 1-20, wherein the rectangular antenna array comprises a reception antenna array, the method further comprising: receiving, using the reception antenna array, a first reference signal from the second network node; receiving, using the reception antenna array, a second reference signal from the third network node; and scheduling, based at least in part on an inter-device interference measurement, a first set of communication resources associated with the second network node and a second set of communication resources associated with the third network node, wherein the inter-device interference measurement is based at least in part on the first reference signal and the second reference signal.

Aspect 22: An apparatus for wireless communication at a device, comprising a processor; memory coupled with the processor; and instructions stored in the memory and executable by the processor to cause the apparatus to perform the method of one or more of Aspects 1-21.

Aspect 23: A device for wireless communication, comprising a memory and one or more processors coupled to the memory, the one or more processors configured to perform the method of one or more of Aspects 1-21.

Aspect 24: An apparatus for wireless communication, comprising at least one means for performing the method of one or more of Aspects 1-21.

Aspect 25: A non-transitory computer-readable medium storing code for wireless communication, the code comprising instructions executable by a processor to perform the method of one or more of Aspects 1-21.

Aspect 26: A non-transitory computer-readable medium storing a set of instructions for wireless communication, the set of instructions comprising one or more instructions that, when executed by one or more processors of a device, cause the device to perform the method of one or more of Aspects 1-21.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first network node having a rectangular antenna array, comprising:

memory; and one or more processors, coupled to the memory, configured to:

communicate with a second network node using a line-of-sight (LOS) multiple input multiple output (MIMO) configuration at a frequency, wherein the second network node is aligned with a LOS communication axis associated with the first network node; and communicate, based at least in part on a multi-user MIMO (MU MIMO) mode, with a third network node using the LOS MIMO configuration and at the frequency, wherein the third network node is not aligned with the LOS communication axis associated with the first network node, and wherein the MU MIMO mode corresponds to an antenna system configuration of the rectangular antenna array, wherein the antenna system configuration includes at least one of an antenna assignment scheme, an antenna amplitude configuration, or an antenna phase configuration.

2. The first network node of claim 1, wherein the one or more processors, to communicate with the third network node, are configured to communicate with the third network node based at least in part on an angular separation between the second network node and the third network node satisfying an angular separation threshold.

3. The first network node of claim 1, wherein the LOS MIMO configuration is based at least in part on an angular separation between the second network node and the third network node.

4. The first network node of claim 1, wherein the antenna assignment scheme comprises a superposition scheme, wherein the one or more processors, to communicate with the second network node, are configured to communicate with the second network node using a set of antennas of the rectangular antenna array, and wherein the one or more processors, to communicate with the third network node, are configured to communicate, based at least in part on the superposition scheme, with the third network node using the set of antennas of the rectangular antenna array simultaneously with communicating with the second network node.

5. The first network node of claim 4, wherein the rectangular antenna array comprises a transmission antenna array, and wherein the one or more processors, to communicate with the third network node, are configured to modulate, based at least in part on the superposition scheme, at least one transmission amplitude corresponding to at least one antenna of the rectangular antenna array.

6. The first network node of claim 4, wherein the one or more processors, to communicate with the second network node, are configured to communicate using at least one even LOS MIMO mode, and wherein the one or more processors, to communicate with the third network node, are configured to communicate using at least one odd LOS MIMO mode.

7. The first network node of claim 6, wherein a first separation distance between the first network node and the second network node is smaller than a second separation distance between the first network node and the third network node.

8. The first network node of claim 1, wherein the antenna assignment scheme comprises a block-wise scheme, wherein the one or more processors, to communicate with the second network node, are configured to communicate with the second network node using a first block of mutually-adjacent antennas of a set of antennas of the rectangular antenna array, and wherein the one or more processors, to communicate with the third network node, are configured to communicate, based at least in part on the block-wise scheme, with the third network node using a second block of mutually-adjacent antennas of the set of antennas.

9. The first network node of claim 8, wherein the one or more processors, to communicate with the second network node, are configured to communicate using a first array gain and a first beam width, and wherein the one or more processors, to communicate with the third network node, are configured to communicate using at least one of a second array gain or a second beam width.

10. The first network node of claim 1, wherein the antenna assignment scheme comprises an interlacing scheme, wherein the one or more processors, to communicate with the second network node, are configured to communicate with the second network node using a first subset of antennas of a set of antennas of the rectangular antenna array, and wherein the one or more processors, to communicate with the third network node, are configured to communicate, based at least in part on the interlacing scheme, with the third network node using a second subset of antennas of the set of antennas, wherein positions, within the rectangular antenna array, of the respective antennas of the first subset of antennas and the second subset of antennas are interlaced based at least in part on the interlacing scheme.

11. The first network node of claim 10, wherein the one or more processors, to communicate with the second network node, are configured to communicate using a first array gain and a first beam width, and wherein the one or more processors, to communicate with the third network node, are configured to communicate using at least one of a second array gain or a second beam width.

12. The first network node of claim 1, wherein the antenna assignment scheme comprises a nesting scheme, wherein the one or more processors, to communicate with the second network node, are configured to communicate with the second network node using an outer subset of antennas of a set of antennas of the rectangular antenna array, and wherein the one or more processors, to communicate with the third network node, are configured to communicate, based at least in part on the nesting scheme, with the third network node using an inner subset of antennas of the set of antennas.

13. The first network node of claim 12, wherein the one or more processors, to communicate with the second network node, are configured to communicate using at least one odd LOS MIMO mode, and wherein the one or more processors, to communicate with the third network node, are configured to communicate using at least one even LOS MIMO mode.

14. The first network node of claim 13, wherein a first separation distance between the first network node and the second network node is smaller than a second separation distance between the first network node and the third network node.

15. The first network node of claim 1, wherein communicating with the third network node comprises applying at least one LOS MIMO beamforming weight, of a plurality of LOS MIMO beamforming weights in an LOS MIMO codebook, to the rectangular antenna array, wherein the MU MIMO mode corresponds to a set of MU MIMO beamforming weights that are not included in the LOS MIMO codebook.

16. The first network node of claim 1, wherein the rectangular antenna array comprises a transmission antenna array, wherein the one or more processors are further configured to:
   transmit a first reference signal to the second network node;
   transmit, using the transmission antenna array, a second reference signal to the third network node;
   receive a first channel response indication from the second network node;
   receive a second channel response indication from the third network node; and
   adjust at least one communication parameter associated with the transmission antenna array based at least in part on at least one of the first channel response indication or the second channel response indication.

17. The first network node of claim 16, wherein at least one of the first channel response indication or the second channel response indication comprises a channel matrix.

18. The first network node of claim 16, wherein at least one of the first channel response indication or the second channel response indication comprises a channel gain measurement associated with at least one of a pair of antennas or a MIMO mode.

19. The first network node of claim 1, wherein the rectangular antenna array comprises a reception antenna array, and wherein the one or more processors are configured to:
   receive, using the reception antenna array, a first reference signal from the second network node;
   receive, using the reception antenna array, a second reference signal from the third network node; and
   schedule, based at least in part on an inter-device interference measurement, a first set of communication resources associated with the second network node and a second set of communication resources associated with the third network node, wherein the inter-device interference measurement is based at least in part on the first reference signal and the second reference signal.

20. A first network node having a rectangular antenna array, comprising:
   memory; and
   one or more processors, coupled to the memory, configured to:
   communicate with a second network node using a line-of-sight (LOS) multiple input multiple output (MIMO) configuration at a frequency; and
   communicate, based at least in part on a multi-user MIMO (MU MIMO) mode, with a third network node using the LOS MIMO configuration and at the frequency, wherein the MU MIMO mode corresponds to an antenna system configuration of the rectangular antenna array, wherein the antenna system configuration includes a superposition scheme, wherein the one or more processors, to communicate with the second network node, are configured to communicate with the second network node using a set of antennas of the rectangular antenna array, and wherein the one or more processors, to communicate with the third network node, are configured to communicate, based at least in part on the superposition scheme, with the third network node using the set of antennas of the rectangular antenna array simultaneously with communicating with the second network node.

21. The first network node of claim 20, wherein the rectangular antenna array comprises a transmission antenna array, and wherein the one or more processors, to communicate with the third network node, are configured to modulate, based at least in part on the superposition scheme, at least one transmission amplitude corresponding to at least one antenna of the rectangular antenna array.

22. The first network node of claim 20, wherein the one or more processors, to communicate with the second network node, are configured to communicate using at least one even LOS MIMO mode, and wherein the one or more processors, to communicate with the third network node, are configured to communicate using at least one odd LOS MIMO mode.

23. The first network node of claim 22, wherein a first separation distance between the first network node and the second network node is smaller than a second separation distance between the first network node and the third network node.

24. A first network node having a rectangular antenna array, comprising:
   memory; and one or more processors, coupled to the memory, config-
ured to:
  communicate with a second network node using a line-
    of-sight (LOS) multiple input multiple output (MIMO)
    configuration at a frequency; and
  communicate, based at least in part on a multi-user MIMO
    (MU MIMO) mode, with a third network node using
    the LOS MIMO configuration and at the frequency,
    wherein the MU MIMO mode corresponds to an
    antenna system configuration of the rectangular
    antenna array, wherein the antenna system configura-
    tion includes an interlacing scheme, wherein the one or
    more processors, to communicate with the second
    network node, are configured to communicate with the
    second network node using a first subset of antennas of
    a set of antennas of the rectangular antenna array, and
    wherein the one or more processors, to communicate
    with the third network node, are configured to commu-
    nicate, based at least in part on the interlacing scheme,
    with the third network node using a second subset of
    antennas of the set of antennas, wherein positions,
    within the rectangular antenna array, of the respective
    antennas of the first subset of antennas and the second
    subset of antennas are interlaced based at least in part
    on the interlacing scheme.

25. The first network node of claim 24, wherein the one
or more processors, to communicate with the second net-
work node, are configured to communicate using a first array
gain and a first beam width, and wherein the one or more
processors, to communicate with the third network node, are
configured to communicate using at least one of a second
array gain or a second beam width.

26. The first network node of claim 24, wherein the
second network node is aligned with a LOS communication
axis associated with the first network node, and wherein the
third network node is not aligned with the LOS communi-
cation axis associated with the first network node.

27. A first network node having a rectangular antenna
array, comprising:
  memory; and one or more processors, coupled to the memory, config-
ured to:
  communicate with a second network node using a line-
    of-sight (LOS) multiple input multiple output (MIMO)
    configuration at a frequency; and
  communicate, based at least in part on a multi-user MIMO
    (MU MIMO) mode, with a third network node using
    the LOS MIMO configuration and at the frequency,
    wherein the MU MIMO mode corresponds to an
    antenna system configuration of the rectangular
    antenna array, wherein the antenna system configura-
    tion comprises a nesting scheme, wherein the one or
    more processors, to communicate with the second
    network node, are configured to communicate with the
    second network node using an outer subset of antennas
    of a set of antennas of the rectangular antenna array,
    and wherein the one or more processors, to communi-
    cate with the third network node, are configured to
    communicate, based at least in part on the nesting
    scheme, with the third network node using an inner
    subset of antennas of the set of antennas.

28. The first network node of claim 27, wherein the one
or more processors, to communicate with the second net-
work node, are configured to communicate using at least one
odd LOS MIMO mode, and wherein the one or more
processors, to communicate with the third network node, are
configured to communicate using at least one even LOS
MIMO mode.

29. The first network node of claim 28, wherein a first
separation distance between the first network node and the
second network node is smaller than a second separation
distance between the first network node and the third net-
work node.

30. The first network node of claim 27, wherein the
second network node is aligned with a LOS communication
axis associated with the first network node, and wherein the
third network node is not aligned with the LOS communi-
cation axis associated with the first network node.

* * * * *